(12) United States Patent
Coates et al.

(10) Patent No.: US 6,912,030 B1
(45) Date of Patent: Jun. 28, 2005

(54) OPTICAL COMPENSATOR AND LIQUID CRYSTAL DISPLAY I

(75) Inventors: David Coates, Dorset (GB); Owain Llyr Parri, Dorset (GB); Mark Verrall, Dorset (GB); Peter Le Masurier, Dorset (GB)

(73) Assignee: Merck Patent GmbH, Darmstadt (DE)

(*) Notice: Subject to any disclaimer, the term of this patent is extended or adjusted under 35 U.S.C. 154(b) by 0 days.

(21) Appl. No.: 10/088,359

(22) PCT Filed: Sep. 13, 2000

(86) PCT No.: PCT/EP00/08934

§ 371 (c)(1),
(2), (4) Date: Mar. 18, 2002

(87) PCT Pub. No.: WO01/20394

PCT Pub. Date: Mar. 22, 2001

(30) Foreign Application Priority Data

Sep. 16, 1999 (EP) .......................... 99117978

(51) Int. Cl.⁷ ............................ G02F 1/1335
(52) U.S. Cl. ............. 349/119; 349/117; 349/118; 349/120; 349/75; 349/76
(58) Field of Search ................ 349/117, 118, 349/119, 120, 121, 75, 76

(56) References Cited

U.S. PATENT DOCUMENTS

| | | |
|---|---|---|
| 4,678,842 A | 7/1987 | Sandler |
| 4,718,618 A | 1/1988 | Ichizuka |
| 5,504,603 A | 4/1996 | Winker et al. |
| 5,528,400 A | 6/1996 | Arakawa |
| 5,798,808 A | 8/1998 | Van Haaren et al. |
| 5,855,971 A * | 1/1999 | Kobori et al. ............... 428/1.2 |
| 5,995,184 A * | 11/1999 | Chung et al. ............... 349/118 |
| 6,245,398 B1 * | 6/2001 | Matsuoka et al. ........... 428/1.3 |
| 6,417,903 B1 | 7/2002 | Kaneko |
| 6,630,974 B2 | 10/2003 | Galabova et al. |

FOREIGN PATENT DOCUMENTS

| | | | |
|---|---|---|---|
| EP | 0218929 | 4/1987 | |
| EP | 0 838 713 | 4/1988 | |
| EP | 0 676 660 | 10/1995 | |
| EP | 864906 | 9/1998 | |
| EP | 0 887 691 | 12/1998 | |
| GB | 2 315 072 A | 1/1998 | |
| WO | WO 96 06379 A | 2/1996 | |
| WO | WO 96 06380 A | 2/1996 | |
| WO | WO 9744703 A1 * | 11/1997 | ......... G02F/1/1335 |
| WO | WO 98/08880 | 3/1998 | |

OTHER PUBLICATIONS

H. Mori et al., "Application of A Negative Birefringence Film To Various LCD Modes," International Display Research Conference (IDRC), US, vol. Conf. 17, pp. M–88–M–97, Sep. 15, 1997, Santa Ana, CA, XP000767506.

(Continued)

*Primary Examiner*—Tarifur R. Chowdhury
*Assistant Examiner*—Michael H. Caley
(74) *Attorney, Agent, or Firm*—Millen, White, Zelano & Branigan, P.C.

(57) ABSTRACT

The invention relates to an optical compensator for liquid crystal displays comprising: at least one O plate retarder (3, 3'), and at least one twisted A plate retarder (6, 6') with a twist angle φ of more than 90°, and further relates to a liquid crystal display comprising such a compensator, a liquid crystal cell (1) and polarizers (2, 2').

23 Claims, 11 Drawing Sheets

OTHER PUBLICATIONS

H. Hitoshi et al., "Improvement of Viewing Angle Characteristics In a Twisted–Nematic Liquid–Crystal Display by Using a Cholesteric Liquid–Crystal Compensation Layer," Applied Physics Letters, US, American Institute of Physics, vol. 60, No. 15, pp. 1806–1808, Apr. 13, 1992, New York, XP000273981.

H. Mori et al., "Performance of A Novel Optical Compensation Film Based on Negative Birefringence of Discotic Compound for Wide–Viewing–Angle Twisted–Nematic Liquid–Crystal Displays", Japanese Journal of Applied Physics, vol. 36, Part 1, No. 1A, pp. 143–147, 1997, Tokyo, XP000736113.

Journal of Polymer Science: Polymer Chemistry Edition, vol. 21, No. 12, Dec. 1983, New York, XP002029280, H. Kise, H. Ogata: Phase Transfer Catalysis in Dehydrofluorination of Poly(vinylidene Fluoride) by Aqueous Sodium Hydroxide Solutions: see pages 3443–p. 3451.

Search Report for International Application No. PCT/US 96/20651 completed Apr. 21, 1997.

Search Report for International Application No. PCT/EP 00/08933 completed Dec. 21, 2000.

* cited by examiner

OPTICAL COMPENSATOR AND LIQUID CRYSTAL DISPLAY I

FIELD OF THE INVENTION

The invention relates to an optical compensator for liquid crystal displays and to a liquid crystal display comprising such a compensator.

BACKGROUND AND PRIOR ART

Optical compensators are used to improve the optical properties of liquid crystal displays (LCD), such as the contrast ratio and the grey scale representation at large viewing angles. For example in uncompensated displays of the TN or STN type at large viewing angles often a change of the grey levels and even grey scale inversion, as well as a loss of contrast and undesired changes of the colour gamut are observed.

An overview of the LCD technology and the principles and methods of optical compensation of LCDs is given in U.S. Pat. No. 5,619,352, the entire disclosure of which is incorporated into this application by way of reference.

As described in U.S. Pat. No. 5,619,352, to improve the contrast of a display at wide viewing angles a negatively birefringent C-plate compensator can be used, however, such a compensator does not improve the greyscale representation of the display. On the other hand, to suppress or even eliminate grey scale inversion and improve the grey scale stability U.S. Pat. No. 5,619,352 suggests to use a birefringent O-plate compensator. An O-plate compensator as described in U.S. Pat. No. 5,619,352 includes an O-plate, and may additionally include one or more A-plates and/or negative C-plates.

The terms 'O-plate', 'A-plate' and 'C-plate' as used in U.S. Pat. No. 5,619,352 and throughout this invention have the following meanings. An 'O-plate' is an optical retarder utilizing a layer of a positively birefringent (e.g. liquid crystal) material with its principal optical axis oriented at an oblique angle with respect to the plane of the layer. An 'A-plate' is an optical retarder utilizing a layer of uniaxially birefringent material with its extraordinary axis oriented parallel to the plane of the layer, and its ordinary axis (also called 'a-axis') oriented perpendicular to the plane of the layer, i.e. parallel to the direction of normally incident light. A 'C-plate' is an optical retarder utilizing a layer of a uniaxially birefringent material with its extraordinary axis (also called 'c-axis') perpendicular to the plane of the layer, i.e. parallel to the direction of normally incident light.

As an O-plate retarder for example an optical retardation film (hereinafter abbreviated as ORF) comprising a layer of a liquid crystal or mesogenic material with tilted or splayed structure can be used.

As an A-plate retarder for example a uniaxially stretched polymer film, like for example a stretched polyvinylalcohol (PVA) or polycarbonate (PC) film, can be used. Alternatively, an A-plate retarder may comprise for example a layer of a positively birefringent liquid crystal or mesogenic material with planar orientation.

As a negatively birefringent C-plate retarder for example a uniaxially compressed polymer film can be used. Alternatively, a negatively birefringent C-plate may comprise for example a layer of a liquid crystal or mesogenic material with a planar orientation and a negative birefringence. Typical examples of negatively birefringent liquid crystal materials are various kinds of discotic liquid crystal compounds.

In addition to U.S. Pat. No. 5,619,352, optical compensators comprising one or more O plates are described in prior art in WO 97/44409, WO 97/44702, WO 97/44703 and WO 98/12584, the entire disclosure of which is incorporated into this application by way of reference. WO 97/44703 and WO 98/12584 further suggest to use tilted or splayed O plates in combination with a planar A plate.

WO 97/44703 reports that the use of a compensator comprising an O plate in combination with a planar A plate, wherein the principal optical axes of both ORFs are oriented at right angles to each other, allows particularly good compensation of a TN-LCD, as it simultaneously reduces the angle dependence of the contrast and the grey scale inversion in the display.

However, when using compensators as described in the above mentioned prior art in combination with liquid crystal displays, especially TN or STN-displays, the improvements of the optical properties of the display, like contrast at wide viewing angles, grey scale level stability, and suppression of grey scale inversion, are still far from sufficient for most applications.

Therefore, it is desirable to have available improved optical compensators to further improve the optical performance of LCDs.

Definition of Terms

In connection with optical polarization, compensation and retardation layers, films or plates as described in the present application, the following definitions of terms as used throughout this application are given.

For the sake of simplicity, the term 'liquid crystal material' is used hereinafter for both liquid crystal materials and mesogenic materials, and the term 'mesogen' is used for the mesogenic groups of the material.

The terms 'tilted structure' or 'tilted orientation' means that the optical axis of the film is tilted at an angle $\theta$ between 0 and 90 degrees relative to the film plane.

The term 'splayed structure' or 'splayed orientation' means a tilted orientation as defined above, wherein the tilt angle additionally varies monotonuously in the range from 0 to 90°, preferably from a minimum to a maximum value, in a direction perpendicular to the film plane.

The term 'low tilt structure' or 'low tilt orientation' means that the optical axis of the film is slightly tilted or splayed as described above, with the average tilt angle throughout the film being between 1 and 10°.

The term 'planar structure' or 'planar orientation' means that the optical axis of the film is substantially parallel to the film plane. This definition also includes films wherein the optical axis is slightly tilted relative to the film plane, with an average tilt angle throughout the film of up to 1°, and which exhibit the same optical properties as a film wherein the optical axis is exactly parallel, i.e. with zero tilt, to the film plane.

The average tilt angle $\theta_{ave}$ is defined as follows $$\theta_{ave} = \frac{\sum_{d'=0}^{d} \theta'(d')}{d}$$

wherein $\theta'(d')$ is the local tilt angle at the thickness d' within the film, and d is the total thickness of the film.

The tilt angle of a splayed film hereinafter is given as the average tilt angle $\theta_{ave}$, unless stated otherwise.

The term 'helically twisted structure' relates to a film comprising one or more layers of liquid crystal material wherein the mesogens are oriented with their main molecular axis in a preferred direction within molecular sublayers, with this preferred orientation direction in different sublayers being twisted around a helix axis that is substantially perpendicular to the film plane, i.e. substantially parallel to the film normal. This definition also includes orientations where the helix axis is tilted at an angle of up to 2° relative to the film normal.

The term 'homeotropic structure' or 'homeotropic orientation' means that the optical axis of the film is substantially perpendicular to the film plane, i.e. substantially parallel to the film normal. This definition also includes films wherein the optical axis is slightly tilted at an angle of up to 2° relative to the film normal, and which exhibit the same optical properties as a film wherein the optical axis is exactly parallel, i.e. with no tilt, to the film normal.

For sake of simplicity, an optical film with a tilted, splayed, low tilted, planar, twisted and homeotropic orientation or structure is hereinafter being shortly referred to as 'tilted film', 'splayed film', 'low tilt film', 'planar film', 'twisted film' and 'homeotropic film', respectively.

Throughout this invention, both a tilted and a splayed film will also be referred to as 'O plate'. A planar film will also be referred to as 'A plate' or 'planar A plate'. A low tilt film will also be referred to as 'low tilt A plate'. A twisted film will also be referred to as 'twisted A plate'.

In tilted, planar and homeotropic optical films comprising uniaxially positive birefringent liquid crystal material with uniform orientation, the optical axis of the film as referred to throughout this invention is given by the orientation direction of the main molecular axes of the mesogens of the liquid crystal material.

In a splayed film comprising uniaxially positive birefringent liquid crystal material with uniform orientation, the optical axis of the film as referred to throughout this invention is given by the projection of the orientation direction of the main molecular axes of the mesogens onto the surface of the film.

The term 'film' as used in this application includes self-supporting, i.e. free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behaviour. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerized.

SUMMARY OF THE INVENTION

One aim of the present invention is to provide an optical compensator having improved properties for compensation of LCDs which does not have the drawbacks of prior art compensators as described above.

Another aspect of the invention relates to the manufacture of an optical compensator according to the present invention, in particular to its manufacture by mass production.

Figure 2:
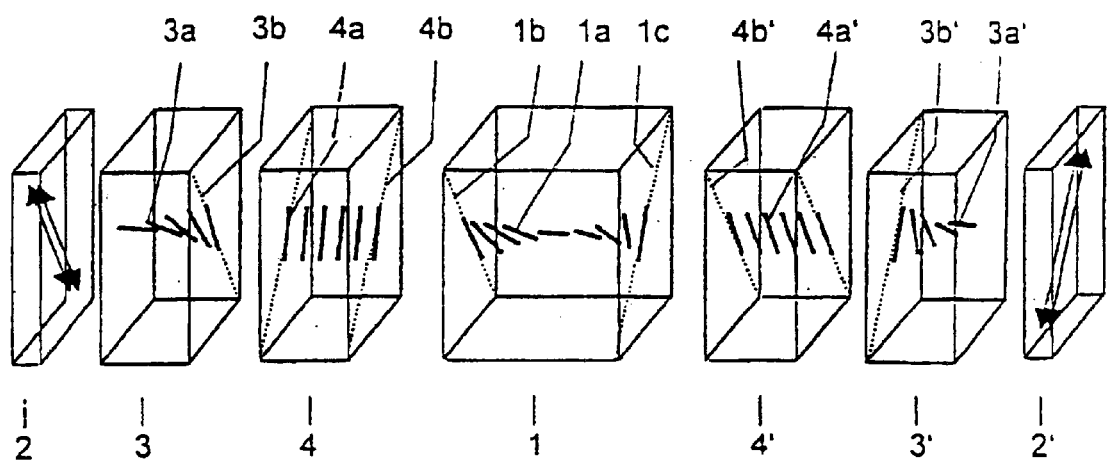
FIG. 2 depicts a compensated TN-LCD device with a compensator according to prior art.

A compensated TN-LCD device as suggested by WO 97/44703 is schematically depicted in FIG. 2 and consists of a TN cell 1 sandwiched between a pair of linear polarizers 2,2' and two compensators, each of which is adjacent to the inner sides of one of the linear polarizers and comprises a splayed O plate 3,3' and a planar A plate 4,4', respectively, wherein the principal optical axes 3b,3b' of the splayed O plate 3,3' and the principal optical axes 4b,4b' of the respective adjacent planar A plate 4,4' are oriented at right angles to each other and oriented either parallel or at right angles to the polarization direction of the respective adjacent linear polarizer 2,2' (indicated by the arrows in FIG. 2). The splayed O plates 3,3' and the planar A plates 4,4' can comprise polymerized liquid crystal material.

However, the embodiment of the compensators as disclosed in WO97/44703 implies severe drawbacks for its mass production.

In mass production, splayed and planar ORFs comprising polymerized liquid crystal material are typically manufactured in the form of a long film that is wound up into a roll. The splayed and planar ORFs thus obtained are subsequently laminated roll-to-roll one onto another and laminated roll-to roll to a linear polarizer, which typically also is manufactured in the form of long films. The multilayered optical film thereby obtained is then cut into sheets of the required size.

In a standard commercially available linear polarizer that is manufactured as a long film, the polarization direction is usually extending in the long direction of the film. Therefore, the splayed ORF (or O plate) and-planar ORF (or A plate) for the compensator as shown in FIG. 2 can only be laminated directly roll-to-roll one onto another and to the linear polarizer, if one of the ORFs has its principal optical axis oriented at right angles to its long direction, and the other ORF has its principal optical axis oriented parallel to its long direction.

In mass production, the ORFs are typically prepared by coating a polymerizable liquid crystal material onto a moving substrate, aligning the material into uniform orientation, and polymerizing the oriented material. Alternatively, a liquid crystal polymer is coated onto a moving substrate and subsequently aligned and optionally crosslinked. Alignment of the liquid crystal material is easily achieved by unidirectionally rubbing the moving substrate, which induces alignment of the mesogens with their main molecular axis substantially parallel to the rubbing direction. In case an optically uniaxial positive birefringent liquid crystal material is used, the principal optical axis of the resulting ORF is also parallel to the rubbing direction.

However, whereas an orientation of the principal optical axis of an ORF parallel to its long direction can easily be achieved in the above production process, simply by unidirectionally rubbing the moving long film substrate parallel to its moving direction, an orientation of the principal optical axis of an ORF at right angles to its long direction is very difficult to achieve. The substrate onto which the liquid crystal material is coated has to be rubbed at right angles to its moving direction, which is practically impossible as long as the substrate is moving.

Obviously, as an alternative the long film substrate can be unidirectionally rubbed at right angles to its long direction whilst not being moved, or the splayed ORF and planar ORF can be manufactured separately, both with their principal optical axis parallel to the film length direction, and then be cut to small sheets and glued together at the required angle. Both methods, however, are rather complicated and more time- and material-consuming, compared to a process using direct roll-to-roll lamination.

Thus, another aim of the present invention is to provide an optical compensator which is easy to manufacture and is particularly suitable for mass production. Other aims of the present invention are immediately evident to the person skilled in the art from the following detailed description.

The inventors of the present invention have found that the above drawbacks can be overcome, and an optical compensator with superior performance for compensation of the optical properties of liquid crystal displays can be obtained by using a combination of at least two ORFs, one of said at least two ORFs being either a tilted or a splayed O plate, and the other of said at least two ORFs being a twisted A plate.

When using an optical compensator according to the present invention in an LCD, the contrast at large viewing angles and the grey level representation of the display are considerably improved, and grey scale inversion is suppressed. In case of coloured displays the colour stability is considerably improved and changes of the colour gamut are suppressed. Furthermore, a compensator according to the present invention is particularly suitable for mass production for the following reason.

A twisted A plate with a helically twisted structure as defined above exhibits throughout its thickness different regions with different orientation directions of the mesogens. In case the liquid crystal material in the twisted A plate is uniaxially positive birefringent, the principal optical axis in each of the different regions of the twisted A plate is parallel to the respective orientation direction of the mesogens in said region. Consequently, if such a twisted A plate, with a twist angle of at least 90°, is used in a stack together with a tilted or splayed O plate and a linear polarizer, the twisted A plate always includes at least one region wherein the principal optical axis is oriented at 90° to the principal optical axis of the O plate, and further includes at least one region wherein the principal optical axis is oriented at 90° to the polarization direction of the adjacent linear polarizer, independently of the orientation of the tilted or splayed O plate and the linear polarizer are oriented in the stack.

Therefore, when using a combination of an O plate and a twisted A plate according to the present invention, instead of a combination of an O plate and a planar A plate as suggested in WO 97/44703, the requirement of crossed principal optical axes of the two ORFs and the above discussed problems of mass production of the ORFs thereby incurred are easily circumvented.

ORFs with twisted structure (or twisted A plates) are known in prior art and have been suggested as compensators for TN and STN displays, as described for example in EP 0 423 881 (Philips), EP 0 576 931 (Casio) and U.S. Pat. No. 5,243,451 (Ricoh). The compensators described in these documents are twisted nematic liquid crystal films, e.g. liquid crystal polymer films, having a value of the twist angle that is in the same range as the twist angle of the liquid crystal medium in the display cell that is to be compensated, i.e. between about 90° for TN cells and up to 270° for STN cells. However, there is no suggestion in these documents to use the twisted ORF in combination with a tilted or splayed ORF.

Furthermore, the inventors of the present invention have found that it is possible to provide an optical compensator with particularly improved properties by using an O plate in combination with a highly twisted A plate. The term 'highly twisted' in this connection means a twisted A plate as defined above, wherein the twist angle $\phi$ is at least 360°.

GB 2,315,072 discloses an optical film comprising a polymerized cholesteric liquid crystal material with helically twisted orientation which shows selective reflection of circular polarized light. This film exhibits a small helical pitch leading to a reflection wavelength in the UV range (i.e. an extremely high twist), and is used as a circular UV polarizer. However, GB 2,315,072 does not disclose to use this film in combination with a tilted or splayed ORF.

One object of the present invention is an optical compensator for liquid crystal displays, characterized in that it comprises
  at least one O plate retarder, and
  at least one twisted A plate retarder with a twist angle $\phi$ of more than 90°.

Another object of the invention is a liquid crystal display device comprising the following elements
  a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates,
  a polarizer arranged outside said transparent substrates, or a pair of polarizers sandwiching said substrates, and
  at least one optical compensator according to the present invention, being situated between the liquid crystal cell and at least one of said polarizers,
it being possible for the above elements to be separated, stacked, mounted on top of each other or connected by means of adhesive layers in any combination of these means of assembly.

DETAILED DESCRIPTION OF THE INVENTION

A preferred embodiment of the present invention relates to an optical compensator comprising at least one O plate and at least one twisted A plate as described above, wherein the average tilt angle $\theta_{ave}$ in said O plate is from 2 to 88°.

Further preferred embodiments of the present invention relate to an optical compensator comprising at least one O plate retarder and at least one twisted A plate retarder as described above, wherein the tilt angle θ in the O plate varies monotonuously in a direction perpendicular to the plane of the film, the tilt angle in the O plate varies from a minimum value $\theta_{min}$ at one surface of the film to a maximum value $\theta_{max}$ at the opposite surface of the film, $\theta_{min}$ in the O plate is from 0 to 80°, preferably from 1 to 20°, $\theta_{max}$ in the O plate is from 10 to 90°, preferably from 40 to 90°, the helical twist angle φ in said twisted A plate is larger than 90°, preferably larger than 180°, very preferably larger than 270°, most preferably at least 360°, the helical pitch p of said twisted A plate is less than 250 nm, the helical pitch of said twisted A plate is from 50 to 250 nm, preferably from 100 to 250 nm, the thickness d of said O plate is from 0.1 to 10 μm, the thickness d of said twisted A plate is from 0.1 to 10 μm, the optical retardation of said O plate is from 6 to 300 nm, the optical retardation of said twisted A plate is from 6 to 300 nm, said O plate and/or twisted A plate comprise a linear or crosslinked liquid crystalline polymer.

Further preferred embodiments of the present invention relate to an optical compensator comprising one O plate and one twisted A plate, one O plate, one twisted A plate, and one or two negative C plate retarders, one O plate and one twisted A plate, at least one of which is provided on a negatively birefringent substrate that has the optical properties of a negative C plate retarder.

A further preferred embodiment of the present invention relates to a liquid crystal display comprising a liquid crystal cell, a pair of polarizers sandwiching the cell, and one inventive compensator as described above and below located on each side of the liquid crystal cell between the cell and the polarizer.

The O plate is preferably oriented with its optical axis parallel to the polarization direction of the adjacent polarizer, and at right angles to the optical axis of the liquid crystal medium at the nearest surface of the liquid crystal cell.

Particularly preferably the compensator is situated in the display such that the twisted A plate is facing the liquid crystal cell and the O plate is facing the polarizer. In case of a splayed O plate, it is preferably situated such that its high tilt surface is facing the polarizer.

Figure 1:
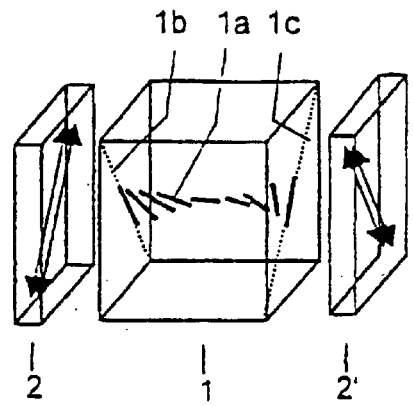
FIG. 1 depicts a conventional uncompensated TN-LCD device.

FIG. 1 depicts an uncompensated standard type TN display device in its off-state, i.e. when no voltage is applied, comprising a TN cell 1 with a liquid crystal layer in the twisted nematic state sandwiched between two transparent electrodes (which are not shown here), and a pair of linear polarizers 2,2'. The twisted nematic orientation of the liquid crystal layer is schematically depicted by the mesogens 1a. The dashed lines 1b and 1c represent the orientation direction of the mesogens 1a that are adjacent to the cell walls of the TN cell 1.

FIG. 2 schematically depicts a compensated TN-LCD device of prior art in its off-state. The device consists of a TN cell 1 with a liquid crystal layer in a twisted nematic state sandwiched between two transparent electrodes (which are not shown here), a pair of linear polarizers 2,2' and two compensators as suggested in WO 97/44703, each compensator consisting of a splayed O plate 3,3' and a planar A plate 4,4' on each side of the TN cell 1.

The stacks of optical components in the devices shown in FIGS. 1 and 2 are symmetrical, hence incoming light may enter the device from either side.

The O plates 3,3' consist, as an example, of a layer of polymerized liquid crystal material with splayed structure. The splayed structure is schematically depicted by the mesogens 3a and 3a' which are oriented with their main molecular axis tilted at an angle relative to the plane of the layer, with the tilt angle increasing in a direction normal to the layer, starting from a minimum value on the side of the layer facing the TN cell.

The dashed lines 3b and 3b' represent the projection of the orientation directions of the mesogens 3a and 3a', respectively, in different regions of the O plates 3,3' onto the surfaces of the respective O plates 3,3'. The dashed lines 3b,3b' are also identical with the principal optical axis of the respective O plates 3,3'. In the device shown in FIG. 2, the principal optical axes of the O plates 3,3' are oriented parallel to the polarization direction of the respective adjacent linear polarizer 2,2', and parallel to the respective adjacent orientation direction 1b,1c of the mesogens 1a in the TN cell 1.

The planar A plates 4,4' consist, as an example, a layer of polymerized liquid crystalline material with planar structure. The planar structure is represented by the mesogens 4a,4a' which are oriented with their main molecular axes parallel to the plane of the layer.

The dashed lines 4b,4b' represent the orientation direction of the mesogens 4a,4a', which is identical with the principal optical axis of the respective planar A plate 4,4'. In the device shown in FIG. 2, the principal optical axis 4b,4b' of the A plate 4,4' is oriented at right angles to the polarization direction of the respective adjacent linear polarizer 2,2', and at right angles to the respective adjacent orientation direction 1b,1c of the mesogens 1a in the TN cell 1.

In the device shown in FIG. 2, the principal optical axes of the splayed O plate 3,3' and planar A plate 4,4' retarders are oriented at right angles to each other and either parallel or at right angles to the polarization direction of the linear polarizers 2,2'.

Figure 3:
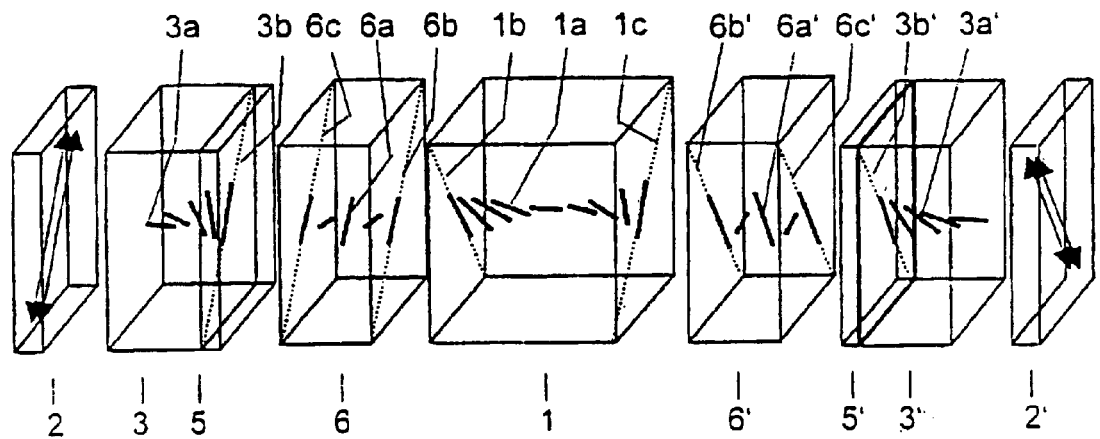
FIGS. 3 and 4 depict compensated TN-LCD devices with compensators according to preferred embodiments of the present invention.

FIG. 3 depicts a compensated TN-LCD device according to a preferred embodiment of the invention in its off-state, i.e. when no voltage is applied, comprising a TN cell 1 with a liquid crystal layer in the twisted nematic state sandwiched between two transparent electrodes (which are not shown here), and a pair of linear polarizers 2,2'. The device further comprises an inventive compensator consisting of a splayed O plate 3,3' and a twisted A plate 6,6' on each side of the TN cell, the splayed O plates 3,3' being provided on a negatively birefringent substrate 5,5'. It is also possible, however, that the substrates 5,5' are omitted.

Like in FIG. 2, in the device as shown in FIG. 3 the O plates 3,3' comprise a polymerized liquid crystalline material with a splayed structure. The splayed structure is represented by the mesogens 3a,3a' which are oriented with their main molecular axes tilted at an angle θ relative to the plane of the layer, wherein the tilt angle θ increases in a direction normal to the film, starting with a minimum value $\theta_{min}$ on the side of the O plate 3,3' facing the TN cell 1.

The principal optical axes of the O plates 3,3' are represented by the dashed lines 3b, 3b', which are identical to the projections of the orientation direction of mesogens 3a,3a' onto the surface of the O plate 3,3'. In the device shown in FIG. 3, the principal optical axis 3b,3b' of the O plate 3,3' is oriented parallel to the polarization direction of the respective adjacent linear polarizer 2,2', and at right angles to the respective adjacent orientation direction 1b,1c of the mesogens 1a in the TN cell 1.

In the preferred device shown e.g. in FIG. 3, the mesogens at the surface of the O plate 3,3' facing the TN cell 1 exhibit a planar orientation, i.e. the minimum tilt angle $\theta_{min}$ is substantially 0 degrees. However, other values of $\theta_{min}$ are also possible.

In the splayed O plate according to the preferred embodiment as shown e.g. in FIG. 3, the minimum tilt angle $\theta_{min}$ is preferably from 0 to 80°, in particular from 1 to 20°, very preferably from 1 to 10° and most preferably from 1 to 5°. The maximum tilt angle $\theta_{max}$ in a splayed O plate according to these preferred embodiments is preferably from 10 to 90°, in particular from 20 to 90°, very preferably from 30 to 90°, most preferably from 40 to 90°.

In the preferred device shown e.g. in FIG. 3, the twisted A plates 6,6' comprise a polymerized liquid crystalline material with a twisted structure, as represented by the mesogens 6a,6a' which are oriented with their main molecular axes parallel to the plane of the A plate and twisted around an axis perpendicular to the plane of the A plate.

The orientation directions of the mesogens 6a,6a' at the surfaces of the twisted A plates 6,6' are represented by the dashed lines 6b,6c,6b' and 6c', and are parallel to the optical axis of the respective adjacent linear polarizer 2,2' and at right angles to the respective adjacent orientation direction 1b,1c of the mesogens 1a in the TN cell 1.

However, other orientations of the mesogens 6a,6a' at the surfaces of the twisted A plates 6,6' are also possible.

In the device shown in FIG. 3, the twisted A plate 6,6' exemplarily exhibits a value of the twist angle φ that is a multiple of an integer of 180°, so that the orientation directions 6b,6b' and 6c,6c' of the mesogens 6a,6a' on the surfaces of the twisted A plate 6,6' are parallel to each other. However, other values of φ are also possible.

Apart from the preferred embodiment as depicted in FIG. 3, other combinations and stack formats of the O plates and twisted A plates are also possible.

For example, in the preferred device shown in FIG. 3, the O plate 3 and the adjacent twisted A plate 6, and/or the O plate 3' and the adjacent twisted A plate 6', are mutually exchangeable with each other. Furthermore, the compensators or entire retarder stacks on one side of the TN cell are mutually exchangeable with the compensators or entire retarder stacks on the opposite side of the TN cell.

Further to the preferred embodiment shown in FIG. 3, a compensator according to the present invention may also comprise more than one O plate and/or more than one twisted A plate.

In case the inventive compensator comprises two or more O plates, the optical axes of the O plates can be parallel one to another, or be oriented at an angle with one another. Preferably the optical axes of the O plates are oriented either parallel or at right angles to each other.

In case an inventive compensator comprises two or more splayed O plates, each splayed O plate can be arranged relative to the closest successive splayed O plate such that their respective surfaces with minimum tilt angle $\theta_{min}$ are facing each other, or such that their respective surfaces with maximum tilt angle $\theta_{max}$ are facing each other, or such that the surface of a first splayed O plate with minimum tilt angle $\theta_{min}$ is facing the surface of the closest successive splayed O plate with maximum tilt angle $\theta_{max}$.

Further preferred arrangements of two or more tilted or splayed O plates in an inventive compensator are those as described in WO 98/12584, in particular those according to the preferred embodiments described in WO 98/12584 on pages 8–11 and in FIGS. 1a, 1b and 1c.

In another preferred embodiment of the present invention, the optical compensator comprises one or more, especially preferably one or two, negative C plates. As a negative C plate, it is possible to use for example a negatively birefringent plastic substrate on which the twisted A plate and/or the O plate are provided.

For example, in the device examplarily shown in FIG. 3 the inventive compensator on either side of the TN cell 1 comprises one O plate 3,3' and one twisted A plate 6,6', wherein each O plate 3,3' is provided on a negatively birefringent substrate 5,5' which has the optical properties of a negative C plate retarder.

Particularly preferred are inventive compensators wherein the O plate is provided on a negatively birefringent substrate. Further preferred are inventive compensators wherein each of the twisted A plate and the O plate are provided on a negatively birefringent substrate.

As a plastic substrate for example a film of polyester such as polyethyleneterephthalate (PET), of polyvinylalcohol (PVA), polycarbonate (PC) or triacetylcellulose (TAC), especially preferably a PET film or a TAC film. As a birefringent substrate for example an uniaxially stretched or compressed plastic film, e.g. PVA or TAC, can be used. For example PET films are commercially available from ICI Corp. under the trade name Melinex.

The device shown in FIG. 3 comprises splayed O plates. Alternatively, it is possible to use tilted, but not splayed, O plates instead of, or in addition to, splayed O plates in the inventive LC displays. Preferably, however the inventive LC displays do comprise one or more splayed O plates.

In the twisted A plate according to the present invention, the twist angle φ is preferably more than 90°, in particular more than 180°, very preferably more than 270°.

In a particularly preferred embodiment of the present invention the twisted A plate exhibits a chiral liquid crystal material, e.g. a cholesteric material, with a highly twisted structure wherein the main molecular axes of the mesogens are helically twisted at an angle of at least 360°, i.e. at least one full helix turn, around an axis perpendicular to the plane of the film.

The twist angle φ of the twisted A plate can also be expressed by the helical pitch p of the liquid crystalline material and the thickness d of the twisted A plate according to the equation $\phi = 360° \cdot d/p$ The helical pitch p of a twisted A plate in an inventive compensator is preferably less than 250 nm, so that the film does not reflect visible light. Preferably the pitch p is from 50 to 250 nm, in particular from 100 to 250 nm.

A highly twisted A plate according to this preferred embodiment preferably comprises a polymerized chiral liquid crystal material with planar structure, as described for example in GB 2,315,072, in particular as described therein on page 2–14 and in examples 1–5. The films described therein do exhibit a a very small helical pitch leading to a reflection wavelength in the UV range. For the purposes of the present invention, highly twisted A plates with a pitch as described in the GB 2,315,072, most preferably with an even smaller pitch, are preferred. These films can be prepared according to or in analogy to the methods described in GB 2,315,072.

The thickness d of the O plate and the thickness d' of the twisted A plate is in each case independently preferably from 0.1 to 10 µm, in particular from 0.2 to 7 µm, most preferably from 0.4 to 4 µm. For some applications, a film thickness between 2 and 15 µm is also suitable.

The retarders according to the present invention, in particular the highly twisted A plates as described above, can also be used as individual components for the optical compensation of liquid crystal displays.

Thus, another object of the present invention is a highly twisted A plate with a twist angle of at least 360° as described above and below for use as a compensator, in particular as viewing angle compensator, and a liquid crystal display comprising a liquid crystal display cell and such a compensator.

It was found that a highly twisted A plate according to the present invention exhibits a compensation performance for liquid crystal displays that is at least equivalent to, and in some cases even better than, the performance of a conventional negatively birefringent C-plate retarder. An inventive highly twisted A plate can therefore be used in replacement for C-plates in LCDs and compensators. This is an additional benefit of the present invention, since the state of the art negatively birefringent C-plates in most cases either require complicated manufacturing procedures such as vapour deposition of an inorganic thin film (as described for exam pie in U.S. Pat. No. 5,196,953), or they require the use of negatively birefringent materials, which are most often less easily available and more expensive than positively birefringent materials. Particularly preferred for the above use are inventive highly twisted A plate having the preferred values of φ, p and d" as described above.

As linear polarizer, a standard type commercially available polarizer can be used. In a preferred embodiment of the present invention the linear polarizer is a low contrast polarizer. In another preferred embodiment of the present invention the linear polarizer is a dichroic polarizer, like a dyed polarizer.

The individual optical components in the inventive compensators and displays, such as the liquid crystal cell, the individual retarders and the linear polarizers, can be separated or can be laminated to other components. They can be stacked, mounted on top of each other or be connected e.g. by means of adhesive layers.

It is also possible that stacks of two or more ORFs are prepared by coating the liquid crystalline material of an ORF directly onto an adjacent ORF, the latter serving as substrate.

The optical compensator and/or the display device according to the present invention may further comprise one or more adhesive layers provided to the individual optical components like the liquid crystal cell, the O plates, the twisted A plates and the linear polarizers.

In case the polymerized liquid crystal material in the O plate and/or the twisted A plate is a polymer with high adhesion, separate adhesive layers may also be omitted. Highly adhesive polymers are for example liquid crystal polyepoxides. Furthermore, liquid crystal linear polymers or crosslinked polymers with low degree of crosslinking show higher adhesion than highly crosslinked polymers. The above highly adhesive liquid crystal polymers are therefore preferred for specific applications, especially for those which do not tolerate additional adhesive layers.

The inventive compensator may also comprise one or more protective layers provided on the surface of the individual optical components described above.

The inventive optical compensators and highly twisted A plates can be used for compensation of conventional displays, in particular those of the twisted nematic mode, such as TN, STN or AMD-TN displays, those of the IPS mode, those of the vertically aligned mode, like e.g. ECB, CSH, VAN or VAC displays, those of the bend mode or π-cell mode, like e.g. OCB displays.

As tilted or splayed O plate for the inventive compensator it is possible to use an optical film comprising a polymerized liquid crystal material with tilted or splayed structure, as described in the U.S. Pat. No. 5,619,352, WO 97/44409, WO 97/44702, WO 97/44703 or WO 98/12584, with the entire disclosure of these documents being incorporated into this application by way of reference.

As splayed O plate, it is also possible to use a multilayer film comprising two or more sublayers of polymerized liquid crystal material, with each sublayer having a tilted structure with constant tilt angle, wherein said tilt angle increases or decreases monotonuously from one sublayer to the next sublayer throughout the multilayer.

In a preferred embodiment of the invention, the O plate is a film as described in WO 98/12584, or a film prepared in analogy to the methods disclosed therein. According to the WO 98/12584, an O plate can be obtained by coating a layer of a polymerizable mesogenic material onto a substrate or between two substrates, aligning the material into a tilted or splayed orientation, and polymerizing the material by exposure to heat or actinic radiation.

As twisted A plate for the inventive compensator, it is possible to use e.g. a twisted nematic polymer film as described in the EP 0 423 881 (Philips), EP 0 576 931 (Casio) or U.S. Pat. No. 5,243,451 (Ricoh).

In case of the twisted A plate, it is also possible to use a layer of a non-polymerized liquid crystal material. For example, a nematic liquid crystal mixture can be used that is provided between two transparent substrates and exhibits a planar twisted orientation, wherein the twist is induced by different orientation of the liquid crystal molecules at the substrates, like in a standard type TN cell, or the twist is brought about by one or more chiral dopants added to the nematic material. Alternatively a layer of a cholesteric liquid crystal mixture can be used.

Alternatively, it is also possible to use as twisted A plate one or more layers of platelets or platelet-shaped flakes comprising an oriented polymerized cholesteric liquid crystal material with planar orientation, these platelets or flakes being dispersed in a light-transmissive binder, and being oriented such that the helix axis of the cholesteric liquid crystal material extends substantially perpendicular to the plane of the layer. Suitable platelets or flakes are described e.g. in WO 97/30136 (Merck), WO 96/18129 (CRL), U.S. Pat. No. 5,364,557 (Faris), EP 0 601 483, EP 0 773 250 or U.S. Pat. No. 5,827,449 (Wacker).

In a preferred embodiment of the invention, the twisted A plate is a film as described in GB 2,315,072, or a film prepared in analogy to the methods disclosed therein, with the entire disclosure of this document being incorporated into this application by way of reference.

Thus, according to GB 2,315,072 a twisted A plate can be obtained by coating a layer of a chiral polymerizable mesogenic material onto a substrate or between two substrates, aligning the material into a twisted orientation, wherein the helical twist axis is perpendicular to the plane of the layer, and polymerizing the material by exposure to heat or actinic radiation.

In case of the twisted A plate, the polymerizable material comprises achiral polymerizable mesogenic compounds and further comprises at least one chiral compound. The chiral compounds can be selected from non-polymerizable chiral compounds, like e.g. chiral dopants as used in liquid crystal mixtures or devices, polymerizable chiral non-mesogenic or polymerizable chiral mesogenic compounds.

In case of the O plate, the polymerizable material preferably consists essentially of achiral polymerizable mesogenic compounds.

Preferably a polymerizable mesogenic material is used that comprises at least one polymerizable mesogen having one polymerizable functional group and at least one polymerizable mesogen having two or more polymerizable functional groups.

In another preferred embodiment the polymerizable material comprises polymerizable mesogenic compounds having two or more polymerizable functional groups (di- or multireactive or di-or multifunctional compounds). Upon polymerization of such a mixture a three-dimensional polymer network is formed. An optical retardation film made of such a network is self-supporting and shows a high mechanical and thermal stability and a low temperature dependence of its physical and optical properties.

By varying the concentration of the multifunctional mesogenic or non mesogenic compounds the crosslink density of the polymer film and thereby its physical and chemical properties such as the glass transition temperature, which is also important for the temperature dependence of the optical properties of the optical retardation film, the thermal and mechanical stability or the solvent resistance can be tuned easily.

The achiral and chiral polymerizable mesogenic mono-, di- or multireactive compounds used for the instant invention can be prepared by methods which are known per se and which are described, for example, in standard works of organic chemistry such as, for example, Houben-Weyl, Methoden der organischen Chemie, Thieme-Verlag, Stuttgart. Typical examples are described for example in WO 93/22397; EP 0 261 712; DE 19504224; DE 4408171 and DE 4405316. The compounds disclosed in these documents, however, are to be regarded me rely as examples that do not limit the scope of this invention.

Examples representing especially useful monoreactive chiral and achiral polymerizable mesogenic compounds are shown in the following list of compounds, which should, however, be taken only as illustrative and is in no way intended to restrict, but instead to explain the present invention:

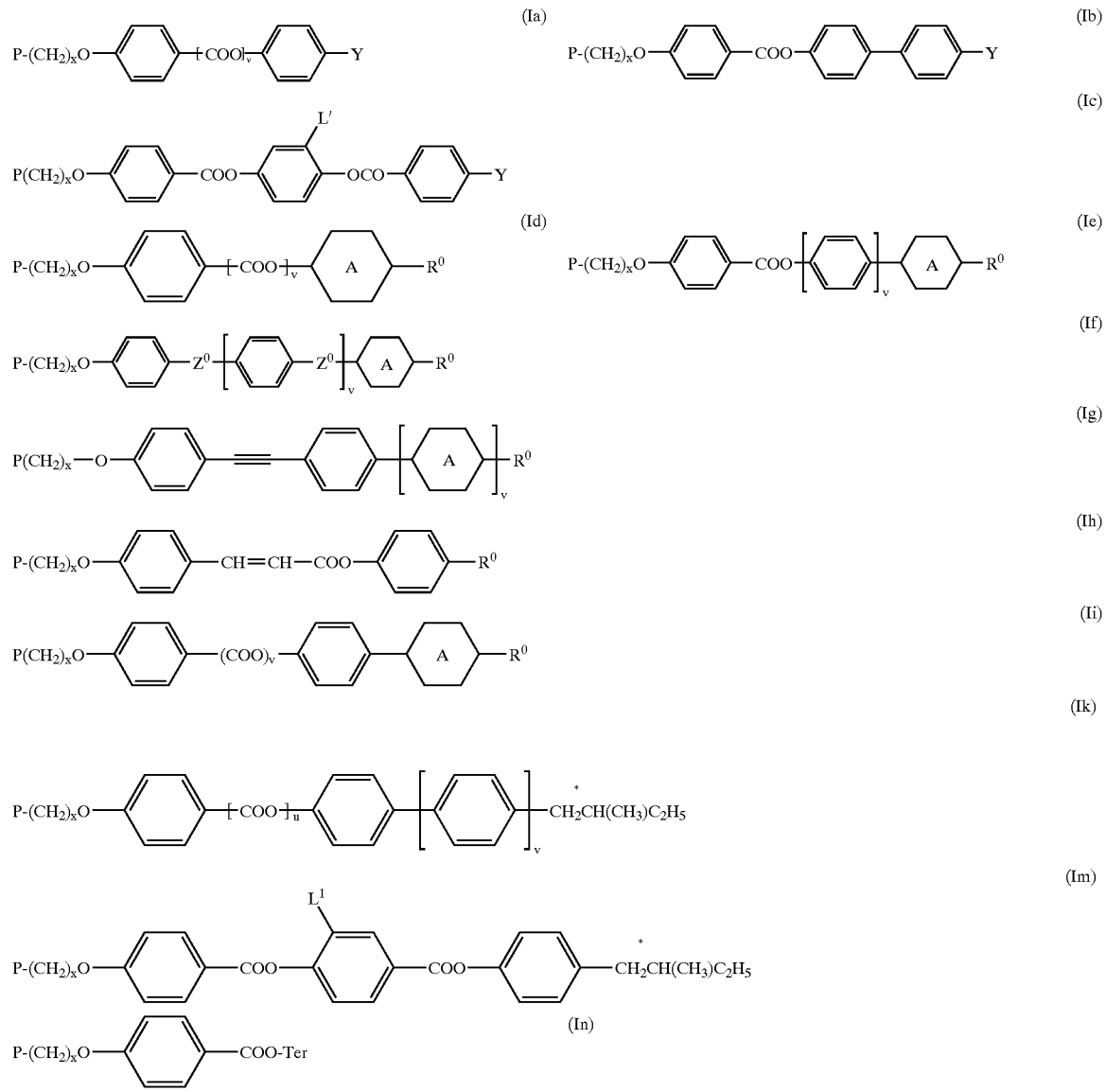

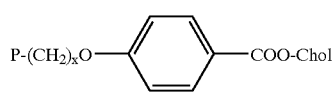
(Io)

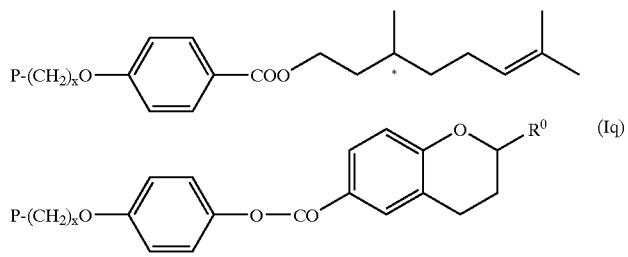

Examples of useful direactive chiral and achiral polymerizable mesogenic compounds are shown in the following list of compounds, which should, however, be taken only as illustrative and is in no way intended to restrict, but instead to explain the present invention trisubstituted by $L^1$ or 1,4-cyclohexylene, v is 0 or 1, $Z^0$ is —COO—, —OCO—, —$CH_2CH_2$— or a single bond, Y is a polar group, $R^0$ is an unpolar alkyl or alkoxy group, Ter is a terpenoid radical like e.g. menthyl, Chol is a cholesteryl group, and $L^1$ and $L^2$ are each independently H, F, Cl, CN

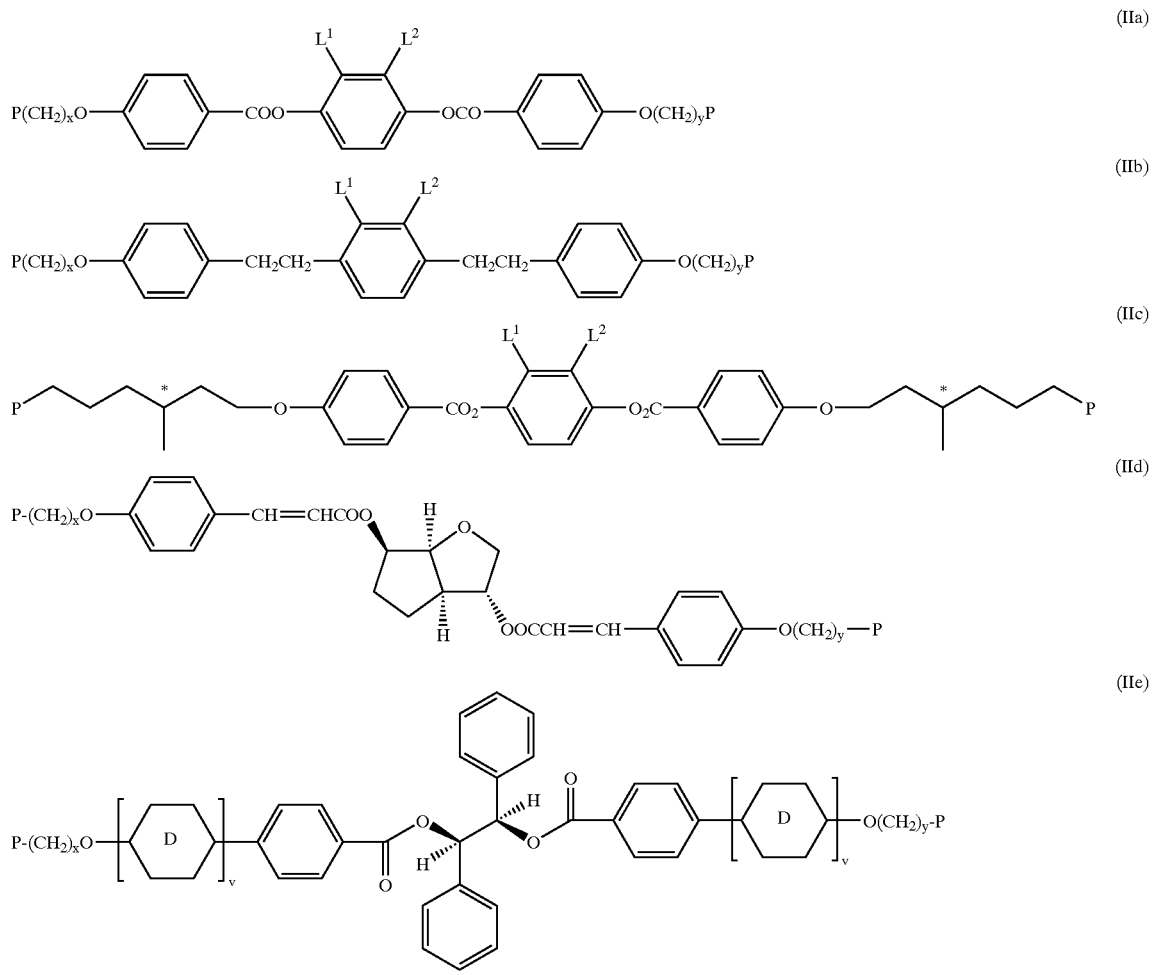

In the above formulae, P is a polymerizable group, preferably an acryl, methacryl, vinyl, vinyloxy, propenyl ether, epoxy or stytryl group, x and y are each independently 1 to 12, A is 1,4-phenylene that is optionally mono- di or trisubstituted or an optionally halogenated alkyl, alkoxy, alkylcarbonyl, alkoxycarbonyl or alkoxycarbonyloxy group with 1 to 7 C atoms.

The term 'polar group' in this connection means a group selected from F, Cl, CN, NO$_2$, OH, OCH$_3$, OCN, SCN, an optionally fluorinated carbonyl or carboxyl group with up to 4 C atoms or a mono- oligo- or polyfluorinated alkyl or alkoxy group with 1 to 4 C atoms.

The term 'unpolar group' means an alkyl group with 1 or more, preferably 1 to 12 C atoms or an alkoxy group with 2 or more, preferably 2 to 12 C atoms.

In case of the preparation of the twisted A plate, the chiral polymerizable mesogenic material may comprise one or more non-polymerizable chiral dopants in addition or alternatively to chiral polymerizable mesogenic compounds. Especially preferred are chiral dopants with a high helical twisting power (HTP), in particular those disclosed in WO 98/00428. Further typically used chiral dopants are e.g. the commercially available S 1011, R 811 or CB 15 (from Merck KGaA, Darmstadt, Germany).

Especially preferred are chiral non-polymerizable dopants selected from the following formulae removed after polymerization or not. When using two substrates in case of curing by actinic radiation, at least one substrate has to be transmissive for the actinic radiation used for the polymerization. Isotropic or birefringent substrates can be used. In case the substrate is not removed from the polymerized film after polymerization, preferably isotropic substrates are used.

Preferably at least one substrate is a plastic substrate such as for example a film of polyester such as polyethyleneterephthalate (PET), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from ICI Corp. under the trade name Melinex.

The polymerizable mesogenic material can also be dissolved in a solvent, preferably in an organic solvent. The solution is then coated onto the substrate, for example by spin-coating or other known techniques, and the solvent is

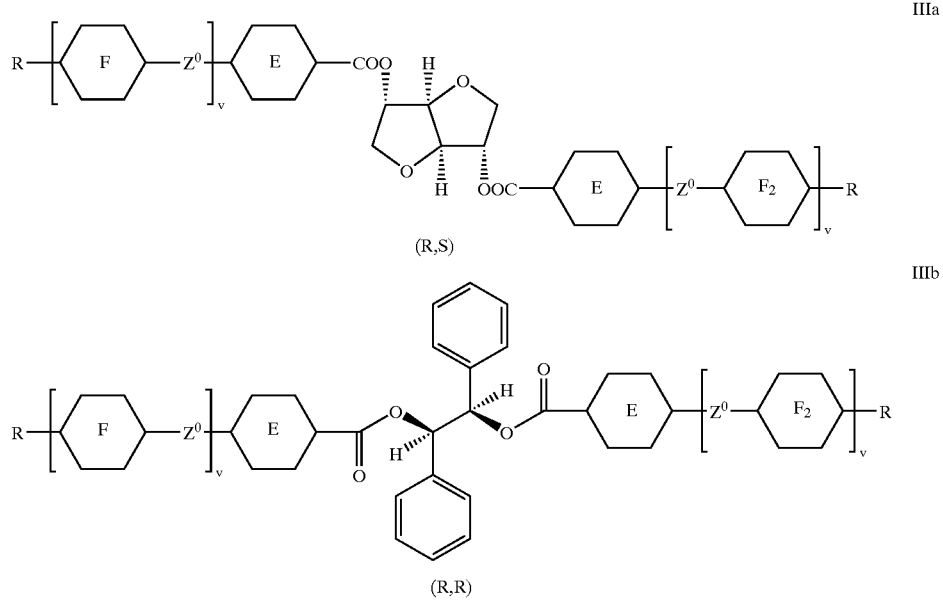

including the (R,S), (S,R), (R,R) and (S,S) enantiomers not shown,
wherein E and F are each independently 1,4-phenylene or trans-1,4-cyclohexylene, v is 0 or 1, Z$^0$ is —COO—, —OCO—, —CH$_2$CH$_2$— or a single bond, and R is alkyl, alkoxy or alkanoyl with 1 to 12 C atoms.

The compounds of formula IIIa and their synthesis are described in WO 98/00428. The compounds of formula IIIb and their synthesis are described in GB 2,328,207.

The above chiral compounds of formula IIIa and IIIb exhibit a very high helical twisting power (HTP), and are therefore particularly useful for the preparation of a highly twisted A plate as used in the present invention.

The polymerizable mesogenic material is coated onto substrate, aligned into a uniform orientation and polymerized according to a process as described in WO 98/12584 or GB 2,315,072, thereby permanently fixing the orientation of the polymerizable mesogenic material.

As a substrate for example a glass or quarz sheet or a plastic film or sheet can be used. It is also possible to put a second substrate on top of the coated mixture prior to and/or during and/or after polymerization. The substrates can be evaporated off before polymerization. In most cases it is suitable to heat the mixture in order to facilitate the evaporation of the solvent.

For preparing the twisted A plate, it is necessary to achieve planar alignment in the layer of the chiral polymerizable material, i.e. with the helical axis being oriented substantially perpendicular to the plane of the layer. Planar alignment can be achieved for example by shearing the material, e.g. by means of a doctor blade. It is also possible to apply an alignment layer, for example a layer of rubbed polyimide or sputtered SiO$_x$, on top of at least one of the substrates.

Planar alignment of the polymerizable mesogenic material can also be achieved by directly rubbing the substrate, i.e. without applying an additional alignment layer. This is a considerable advantage as it allows a significant reduction of the production costs of the optical retardation film. In this way a low tilt angle can easily be achieved.

For example rubbing can be achieved by means of a rubbing cloth, such as a velvet cloth, or with a flat bar coated with a rubbing cloth. In a preferred embodiment of the present invention rubbing is achieved by means of a at least one rubbing roller, like e.g. a fast spinning roller that is brushing across the substrate, or by putting the substrate between at least two rollers, wherein in each case at least one of the rollers is optionally covered with a rubbing cloth. In another preferred embodiment of the present invention rubbing is achieved by wrapping the substrate at least partially at a defined angle around a roller that is preferably coated with a rubbing cloth.

Planar alignment with a low tilt angle can be achieved by adding a surfactant to the polymerizable mesogenic material. Suitable surfactants are described for example in J. Cognard, Mol. Cryst. Liq. Cryst. 78, Supplement 1, 1–77 (1981.). Particularly preferred are non-ionic surfactants, such as mixtures of non-ionic fluoroalkylalkoxylate surfactants selected from formula IV and V $$C_nF_{2n-1}SO_2N(C_2H_5)(CH_2CH_2O)_xCH_3 \qquad IV$$

$$C_nF_{2n-1}(CH_2CH_2O)_xH \qquad V$$

wherein n is an integer from 4 to 12 and x is an integer from 5 to 15. Upon using these surfactants it is possible to produce polymerized films with a low tilt angle in the range from 0 to 1 degrees, in particular 0 to 0.5 degrees. In the best case the tilt angle is approximately 0 degrees.

The surfactants of formula IV are commercially available under the trade name Fluorad 171 (from 3M Co.), the surfactants of formula V under the trade name Zonyl FSN (from DuPont).

In case surfactants are used, the polymerizable mesogenic material contains preferably from 500 to 2500 ppm, in particular from 1000 to 2500 ppm, very preferably from 1500 to 2500 ppm of surfactants.

The orientation of the mesogenic material depends, inter alia, on the film thickness, the type of substrate material, and the composition of the polymerizable mesogenic material. It is therefore possible, by changing these parameters, to control the structure of the film, in particular specific parameters such as the tilt angle and its degree of variation.

Thus, for the preparation of the O plate, it is possible to adjust the alignment profile in the direction perpendicular to the film plane by appropriate selection of the ratio of monoreactive mesogenic compounds, i.e. compounds with one polymerizable group, and direactive mesogenic compounds, i.e. compounds with two polymerizable groups.

For an O plate with strong splay, i.e. a large variation of the tilt angle throughout the thickness of the film, preferably the ratio of mono- to direactive mesogenic compounds should be in the range of 6:1 to 1:2, preferably 3:1 to 1:1, especially preferably about 3:2.

Another effective means to adjust the desired splay geometry is to use a defined amount of dielectrically polar polymerizable mesogenic compounds in the polymerizable mesogenic material. These polar compounds can be either monoreactive or direactive. They can be either dielectrically positive or negative. Most preferred are dielectrically positive and monoreactive mesogenic compounds.

The amount of the polar compounds in the mixture of polymerizable mesogenic material is preferably 1 to 80%, especially 3 to 60%, in particular 5 to 40% by weight of the total mixture.

Polar mesogenic compound in this connection means a compound with one or more polar groups. Preferably these groups are selected from terminal or lateral end groups like CN, F, Cl, OCF$_3$, OCF$_2$H, OC$_2$F$_5$, CF$_3$, OCN or SCN, or from linking groups like —COO—, —OCO—, —O—, —S—, —OCH$_2$—, —CH$_2$O—, —OCOO—, —COO—CH=CH— or —CF$_2$=CF$_2$—, linking the ring groups of the mesogenic core. Very preferably these groups are selected from CN, F, Cl and OCF$_3$. Especially preferred are monoreactive polar compounds selected from formulae Ia to Ic given above.

Furthermore, these polar compounds preferably exhibit a high absolute value of the dielectric anisotropy $\Delta\epsilon$, which is typically higher than 1.5. Thus, dielectrically positive compounds preferably exhibit $\Delta\epsilon>1.5$ and dielectrically negative polar compounds preferably exhibit $\Delta\epsilon<-1.5$. Very preferred are dielectrically positive polar compounds with $\Delta\epsilon>3$, in particular with $\Delta\epsilon>5$.

Polymerization of the polymerizable mesogenic material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation.

As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

The polymerization is carried out in the presence of an initiator absorbing at the wavelength of the actinic radiation. For example, when polymerizing by means of UV light, a photoinitiator can be used that decomposes under UV irradiation to produce free radicals or ions that start the polymerization reaction.

When curing polymerizable mesogens with acrylate or methacrylate groups, preferably a radical photoinitiator is used, when curing polymerizable mesogens vinyl and epoxide groups, preferably a cationic photoinitiator is used.

It is also possible to use a polymerization initiator that decomposes when heated to produce free radicals or ions that start the polymerization.

As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

The polymerizable mesogenic material preferably comprises 0.01 to 10%, very preferably 0.05 to 5%, in particular 0.1 to 3% of a polymerization initiator. UV photoinitiators are preferred, in particular radicalic UV photoinitiators.

The curing time is dependening, inter alia, on the reactivity of the polymerizable mesogenic material, the thickness of the coated layer, the type of polymerization initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

In addition to polymerization initiators the polymerizable material may also comprise one or more other suitable components such as, for example, catalysts, stabilizers, chain-transfer agents, co-reacting monomers or surface-active compounds. In particular the addition of stabilizers is preferred in order to prevent undesired spontaneous polymerization of the polymerizable material for example during storage.

As stabilizers in principal all compounds can be used that are known to the skilled in the art for this purpose. These compounds are commercially available in a broad variety.

Typical examples for stabilizers are 4-ethoxyphenol or butylated hydroxytoluene (BHT).

Other additives, like e.g. chain transfer agents, can also be added to the polymerizable material in order-to modify the physical properties of the inventive polymer film. When adding a chain transfer agent, such as monofunctional thiol compounds like e.g. dodecane thiol or multifunctional thiol compounds like e.g. trimethylpropane tri(3-mercaptopropionate), to the polymerizable material, the length of the free polymer chains and/or the length of the polymer chains between two crosslinks in the inventive polymer film can be controlled. When the amount of the chain transfer agent is increased, the polymer chain length in the obtained polymer film is decreasing.

It is also possible, in order to increase crosslinking of the polymers, to add up to 20% of a non mesogenic compound with two or more polymerizable functional groups to the polymerizable material alternatively or in addition to the di- or multifunctional polymerizable mesogenic compounds to increase crosslinking of the polymer.

Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

In another preferred embodiment the mixture of polymerizable material comprises up to 70%, preferably 3 to 50% of a non mesogenic compound with one polymerizable functional group. Typical examples for monofunctional non mesogenic monomers are alkylacrylates or alkylmethacrylates.

It is also possible to add, for example, a quantity of up to 20% by weight of a non polymerizable liquid-crystalline compound to adapt the optical properties of the optical retardation film.

In some cases it is of advantage to apply a second substrate to aid alignment and exclude oxygen that may inhibit the polymerization. Alternatively the curing can be carried out under an atmosphere of inert gas. However, curing in air is also possible using suitable photoinitiators and high UV lamp power. When using a cationic photoinitiator oxygen exclusion most often is not needed, but water should be excluded. In a preferred embodiment of the invention the polymerization of the polymerizable mesogenic material is carried out under an atmosphere of inert gas, preferably under a nitrogen atmosphere.

To obtain a polymer film with the desired molecular orientation the polymerization has to be carried out in the liquid crystal phase of the polymerizable mesogenic material. Therefore, preferably polymerizable mesogenic compounds or mixtures with low melting points and broad liquid crystal phase ranges are used. The use of such materials allows to reduce the polymerization temperature, which makes the polymerization process easier and is a considerable advantage especially for mass production.

The selection of suitable polymerization temperatures depends mainly on the clearing point of the polymerizable material and inter alia on the softening point of the substrate. Preferably the polymerization temperature is at least 30 degrees below the clearing temperature of the polymerizable mesogenic mixture.

Polymerization temperatures below 120° C. are preferred. Especially preferred are temperatures below 90° C., in particular temperatures of 60° C. or less.

The invention is further explained by the following examples. Therein, the following abbreviations are used:

θ tilt angle [degrees]
φ twist angle [degrees]
p helical pitch [nm]
$n_e$ extraordinary refractive index (at 20° C. and 589 nm)
$n_o$ ordinary refractive index (at 20° C. and 589 nm)
$\epsilon_{\parallel}$ dielectric constant parallel to the long molecular axis (at 20° C. and 1 kHz)
$\epsilon_{\perp}$ dielectric constant perpendicular to the long molecular axis (at 20° C. and 1 kHz)
$K_{11}$ first elastic constant
$K_{22}$ second elastic constant
$K_{33}$ third elastic constant
$V_{on}$ threshold voltage [V]
$V_{off}$ saturation voltage [V]
d layer thickness [μm]

COMPARISON EXAMPLE A

An uncompensated standard type TN-LCD device as depicted in FIG. 1, comprising a TN cell 1 and a pair of linear polarizers 2,2' has the following parameters

| | |
|---|---|
| $n_e$ | 1.5700 |
| $n_o$ | 1.4785 |
| $\epsilon_{\perp}$ | 3.5 |
| $\epsilon_{\parallel}$ | 10.8 |
| $K_{11}$ | 11.7 |
| $K_{22}$ | 5.7 |
| $K_{33}$ | 15.7 |
| d | 5.25 μm |
| pre-tilt | 2° |
| $V_{on}$ | 4.07 V |
| $V_{off}$ | 1.56 V |

Figure 5A:
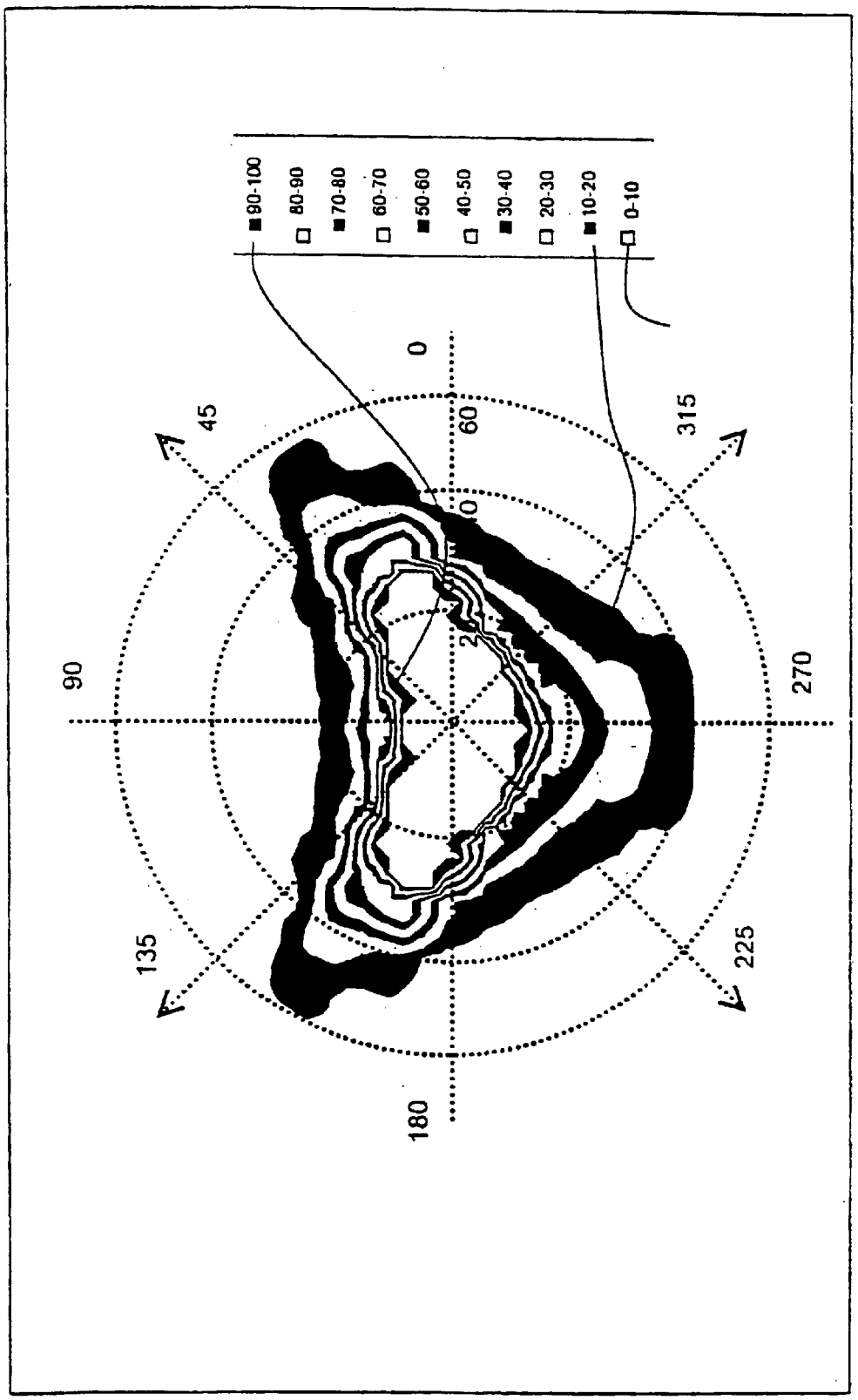
FIG. 5a is an isocontrast plot of a conventional uncompensated TN-LCD device according to comparison example A.

FIG. 5a depicts the isocontrast plot of the display, showing ranges of identical contrast in steps of 10%. The isocontrast plots are measured as luminance at $V_{on}$/luminance at $V_{off}$.

Figure 5B:
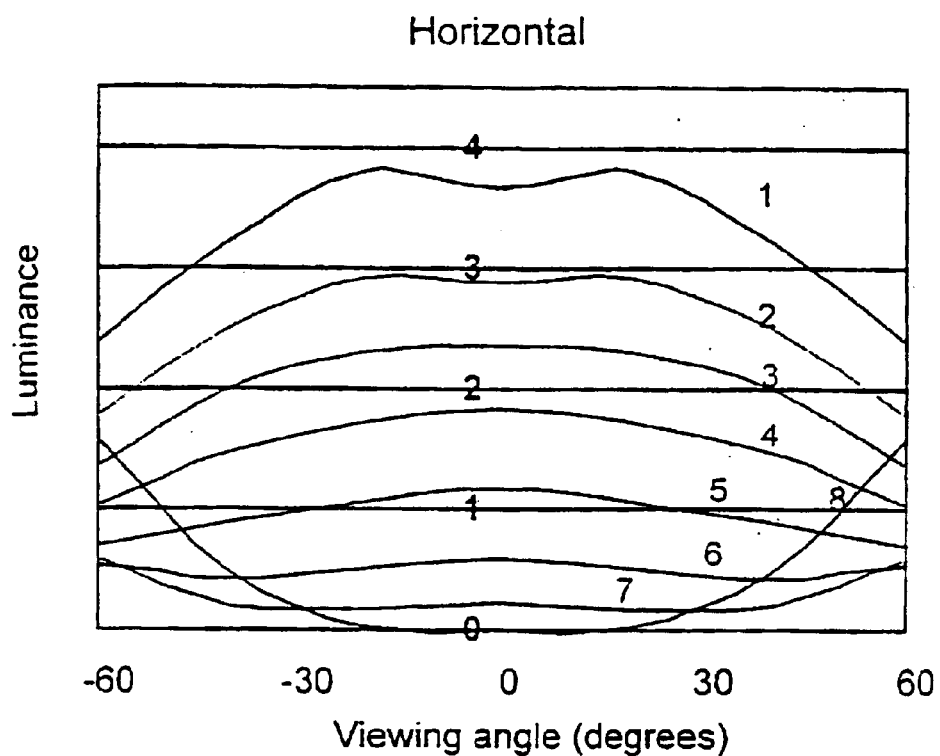
FIGS. 5b and 5c are grey level diagrams of a conventional uncompensated TN-LCD device of comparison example A in horizontal (b) and vertical (c) viewing planes.
Figure 5C:
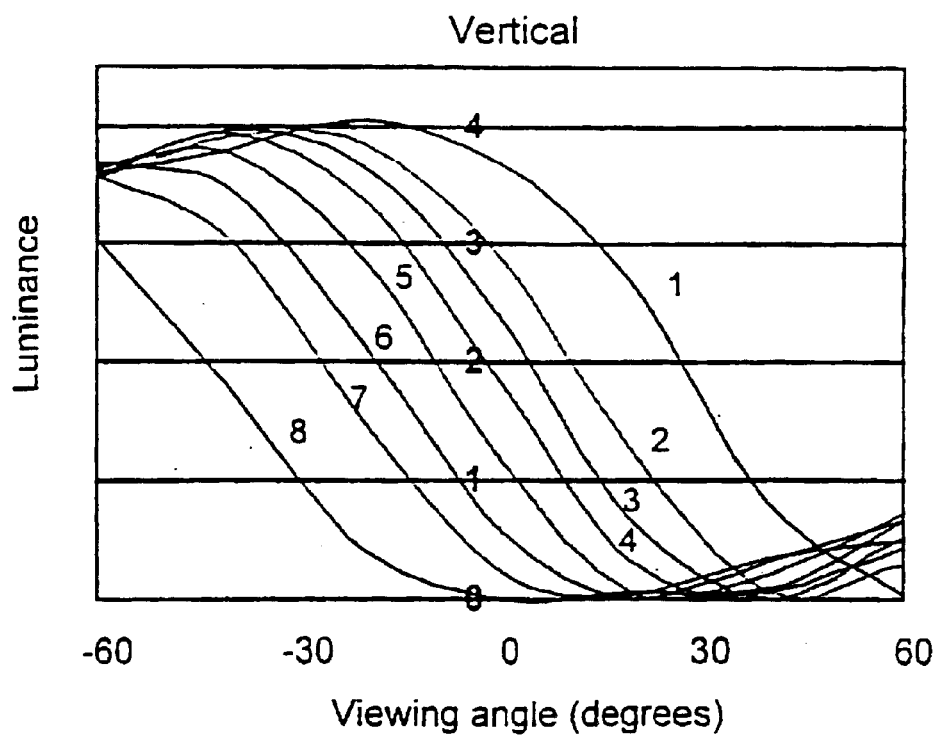

FIG. 5b and FIG. 5c show 8 grey levels (given as transmission versus viewing angle), on a linear luminance scale in horizontal and vertical viewing planes, respectively. Ideally, the grey level lines should be parallel, where they cross, grey level inversion occurs. The latter is a serious disadvantage especially for the darker grey levels. It can be seen in FIG. 5b that levels 7 and 8 are very poor even at low angles such as 30° in horizontal direction, and in FIG. 5c that the levels cross at angles of 30° and higher in vertical direction.

The polarisers can be any standard polariser used in normal LCD displays.

$V_{on}$, $V_{off}$ correspond to values generally adopted in TN and STN-LCD displays.

COMPARISON EXAMPLE B

A conventional compensated TN-LCD device as depicted in FIG. 2 consists of a TN cell 1 with a liquid crystal layer in a twisted nematic state, a pair of linear polarizers 2,2' and a pair of compensators as disclosed in WO 97/44703, each of said compensators consisting of a splayed O plate 3,3' and a planar A plate 4,4'.

The TN cell 1 is as defined in example A.

The splayed O plates 3,3' exhibit a splayed structure with the tilt angle θ ranging from $\theta_{min}$ on one surface to $\theta_{max}$ on the opposite surface. The film parameters are as follows

| | |
|---|---|
| $\theta_{min}$ | 2° |
| $\theta_{max}$ | 88° |
| $\theta_{ave}$ | 45° |
| $n_e$ | 1.610 |
| $n_o$ | 1.495 |
| d | 1.2 µm |
| retardation | 69 nm |

The parameters of the planar A plates 4,4' are as follows

| | |
|---|---|
| $n_e$ | 1.610 |
| $n_o$ | 1.495 |
| d' | 0.91 µm |
| retardation | 105 nm |

Figure 6A:
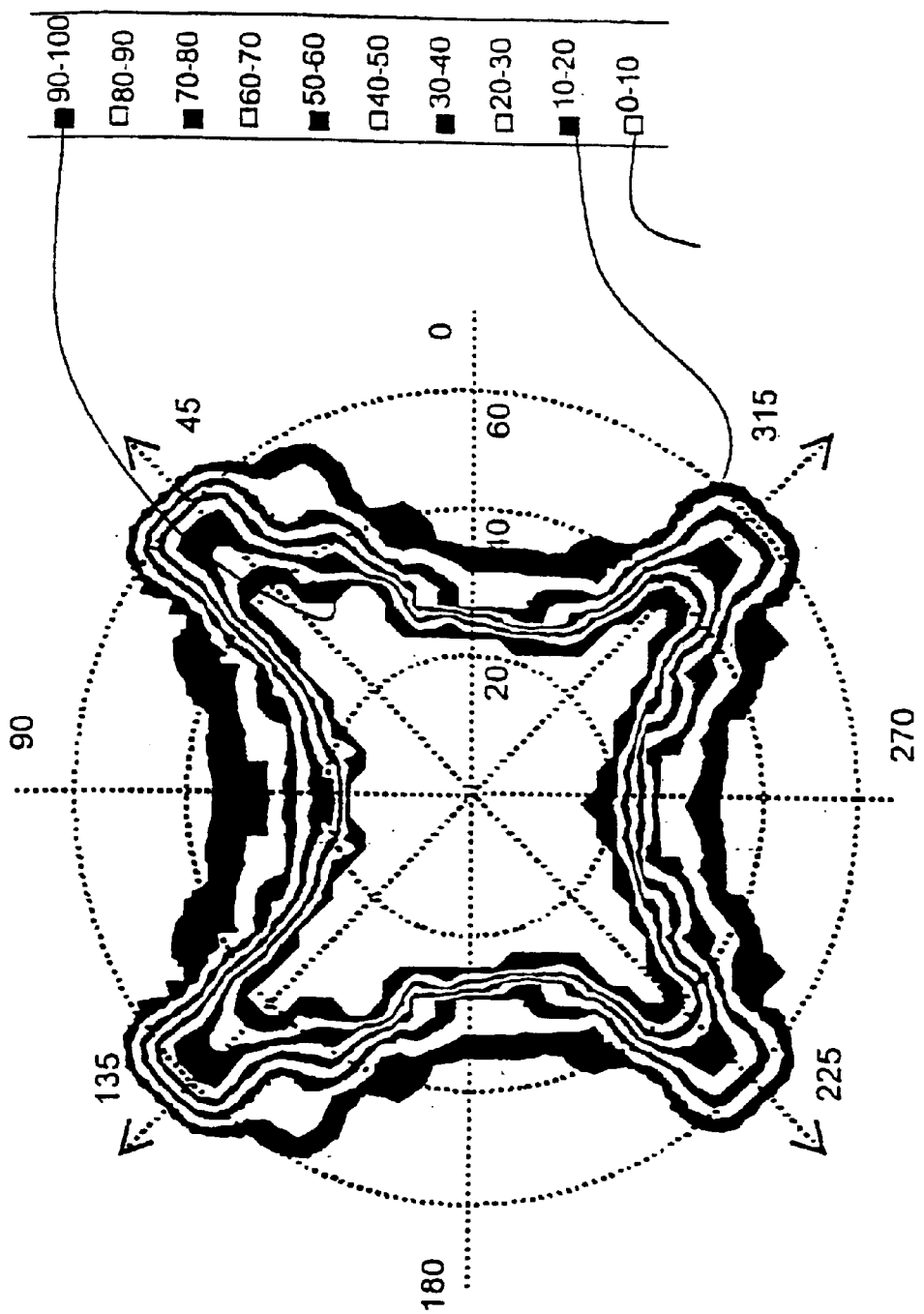
FIG. 6a is an isocontrast plot of a compensated TN-LCD device of comparison example B with a compensator according to prior art.
Figure 6B:
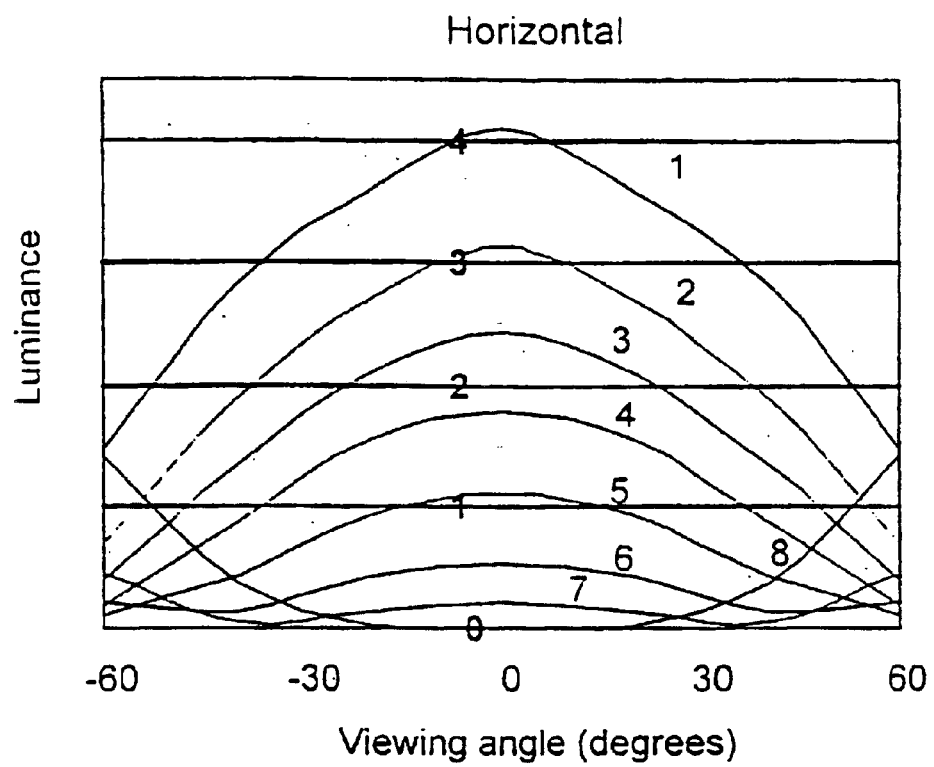
FIGS. 6b and 6c are grey level diagrams of a compensated TN-LCD device of comparison example B, with a compensator according to prior art, in horizontal (b) and vertical (c) viewing planes.
Figure 6C:
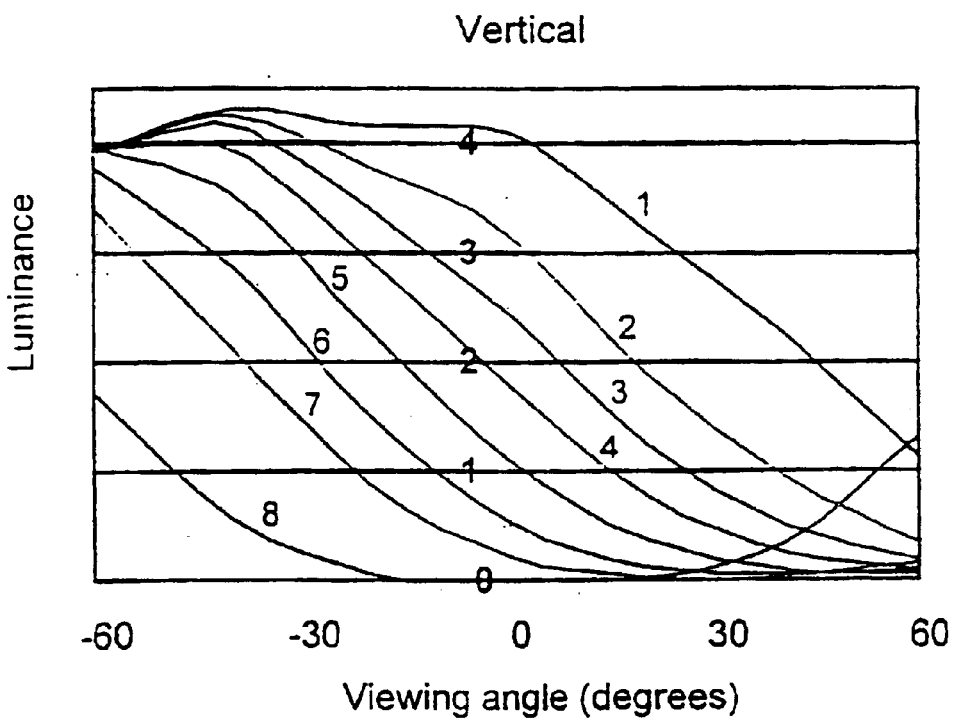

FIG. 6a shows the isocontrast plot of the display, FIG. 6b and FIG. 6c show the grey levels (transmission vesus viewing angle) in horizontal and vertical directions respectively.

In the isocontrast plot FIG. 6a it can be seen that the display has a viewing angle that is larger in horizontal direction, compared to the uncompensated display of example A, but is still narrow in vertical direction. In FIG. 6b and FIG. 6c it can be seen that the grey levels 7 and 8 in horizontal direction are improved compared to the uncompensated display of example A, but are still poor in vertical direction, where they cross already at angles of −30 and 30°.

EXAMPLE 1

A compensated TN-LCD device according to the present invention as depicted in FIG. 3 comprises a TN cell 2, a pair of linear polarizers 2,2', two splayed O plates 3,3' and two twisted A plates 6,6', each ORF being provided on a substrate 5,5', wherein the TN cell 1 and the linear polarizers 2,2' are as defined in comparison example A.

The splayed O plates 3,3' are as defined in comparison example B, except for the film thickness d being 3.0 µm.

The substrates 5,5' are negatively birefringent TAC films with the following refractive indices

| | |
|---|---|
| $n_x$ | 1.48158 |
| $n_y$ | 1.48153 |
| $n_z$ | 1.48090 | wherein the x and y are directions parallel to the film plane and z is the direction perpendicular to the film plane.

The parameters of the twisted A plates 6,6' are as follows

| | |
|---|---|
| $n_e$ | 1.610 |
| $n_o$ | 1.495 |
| d" | 3.0 µm |
| p | <250 nm |
| φ | >5400° |

Figure 7A:
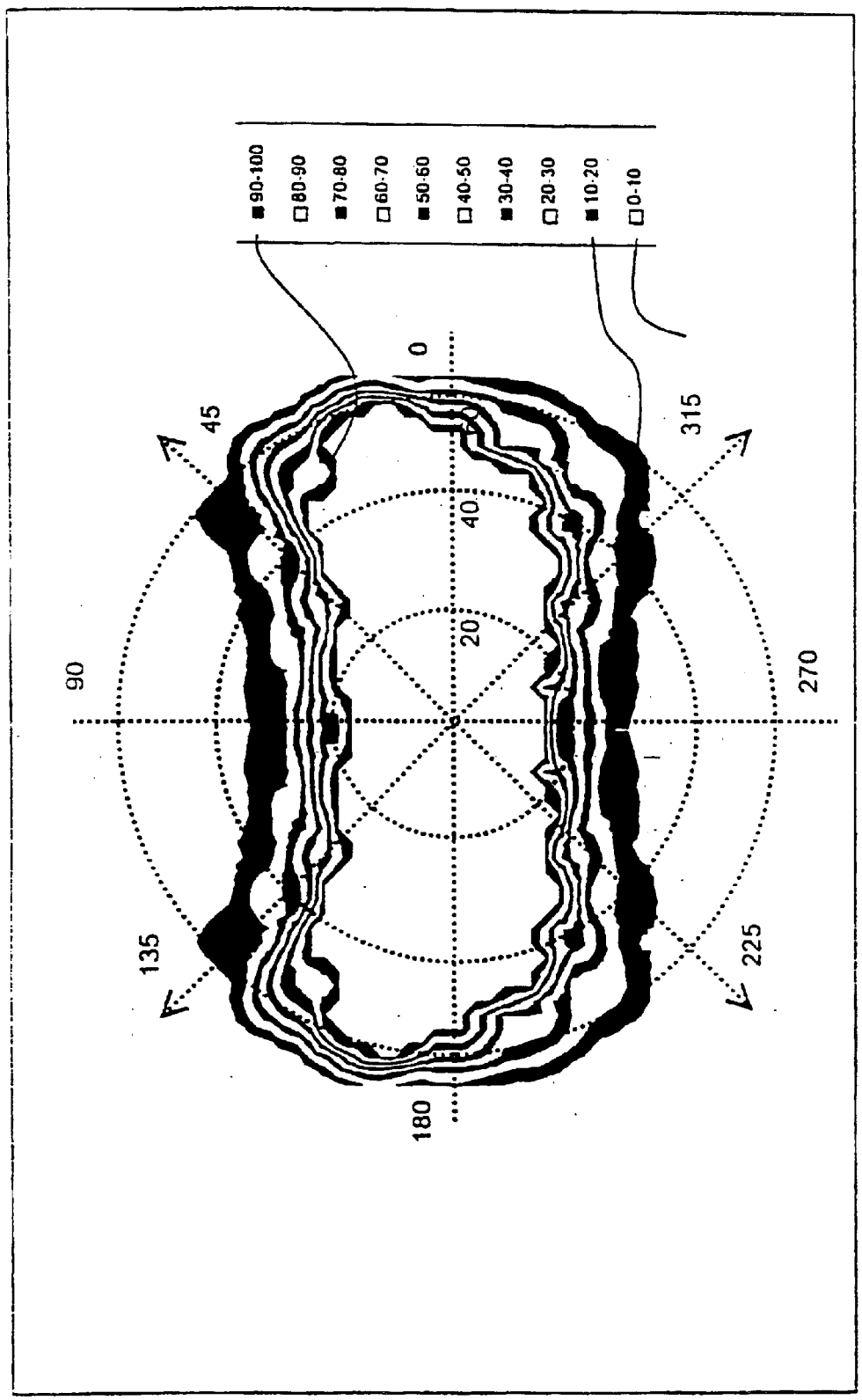
FIGS. 7a and 8a are isocontrast plots of compensated TN-LCD devices of example 1 and 2, respectively, with compensators according to the present invention.
Figure 7B:
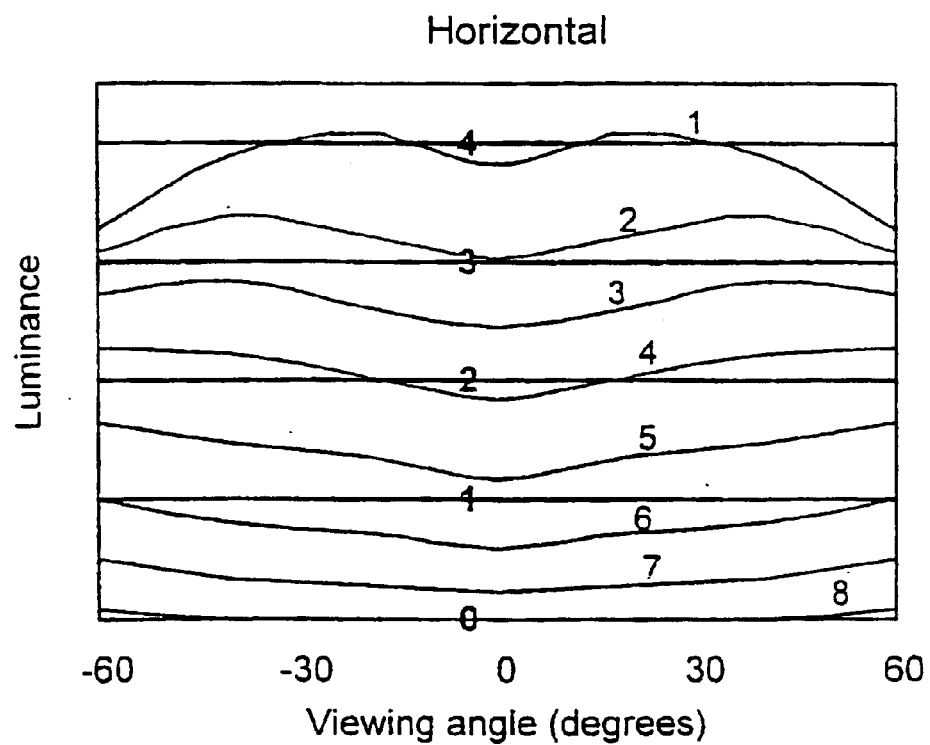
FIGS. 7b,7c and 8b,8c are grey level diagrams of compensated TN-LCD devices of example 1 and 2, respectively, with compensators according to the present invention, in horizontal (b) and vertical (c) viewing planes.
Figure 7C:
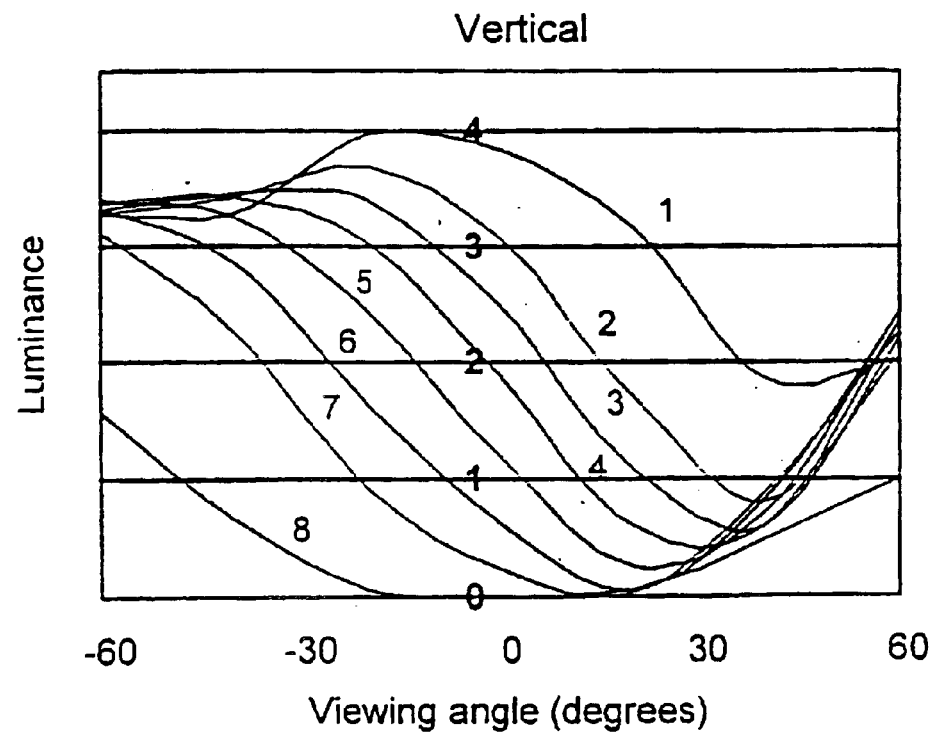

FIG. 7a shows the isocontrast plot of the display, FIG. 7b and FIG. 7c show the grey levels (transmission versus viewing angle) in horizontal and vertical directions respectively. It is obvious that, compared to the compensated display according to prior art of comparison example 8, the viewing angle is significantly enlarged (see FIG. 7a), and the grey levels are further improved, both in horizontal and vertical direction.

EXAMPLE 2

Figure 4:
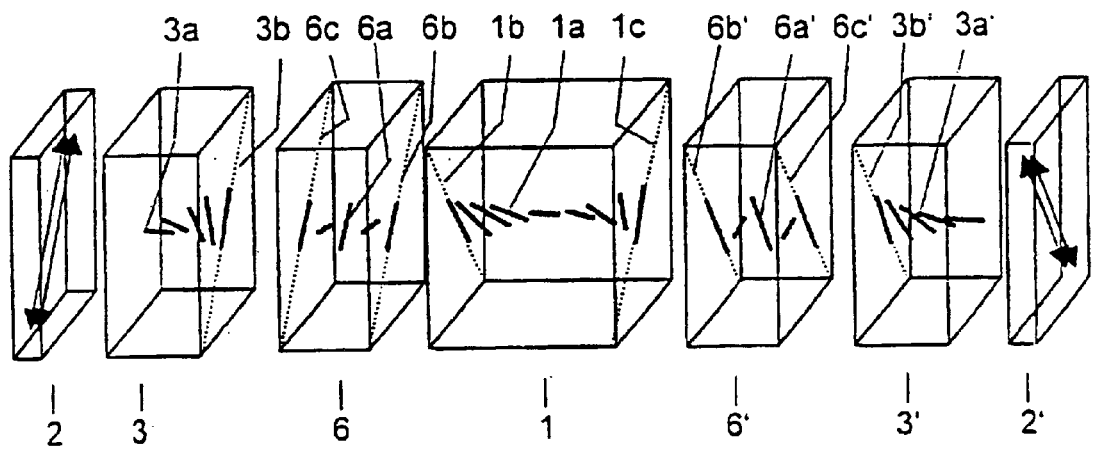

A compensated TN-LCD device according to the present invention as depicted in FIG. 4 a TN cell 2, a pair of linear polarizers 2,2', two splayed O plates 3,3' and two twisted A plates 6,6', wherein the TN cell 1 and linear polarizers 2,2' are as defined in comparison example A.

The splayed O plates 3,3' are as defined in comparison example B, except for the film thickness d being 3.0 µm. The twisted A plates 6,6' are as defined in example 1, except for the film thickness d being 40 µm and the twist angle φ being >7200°.

Figure 8A:
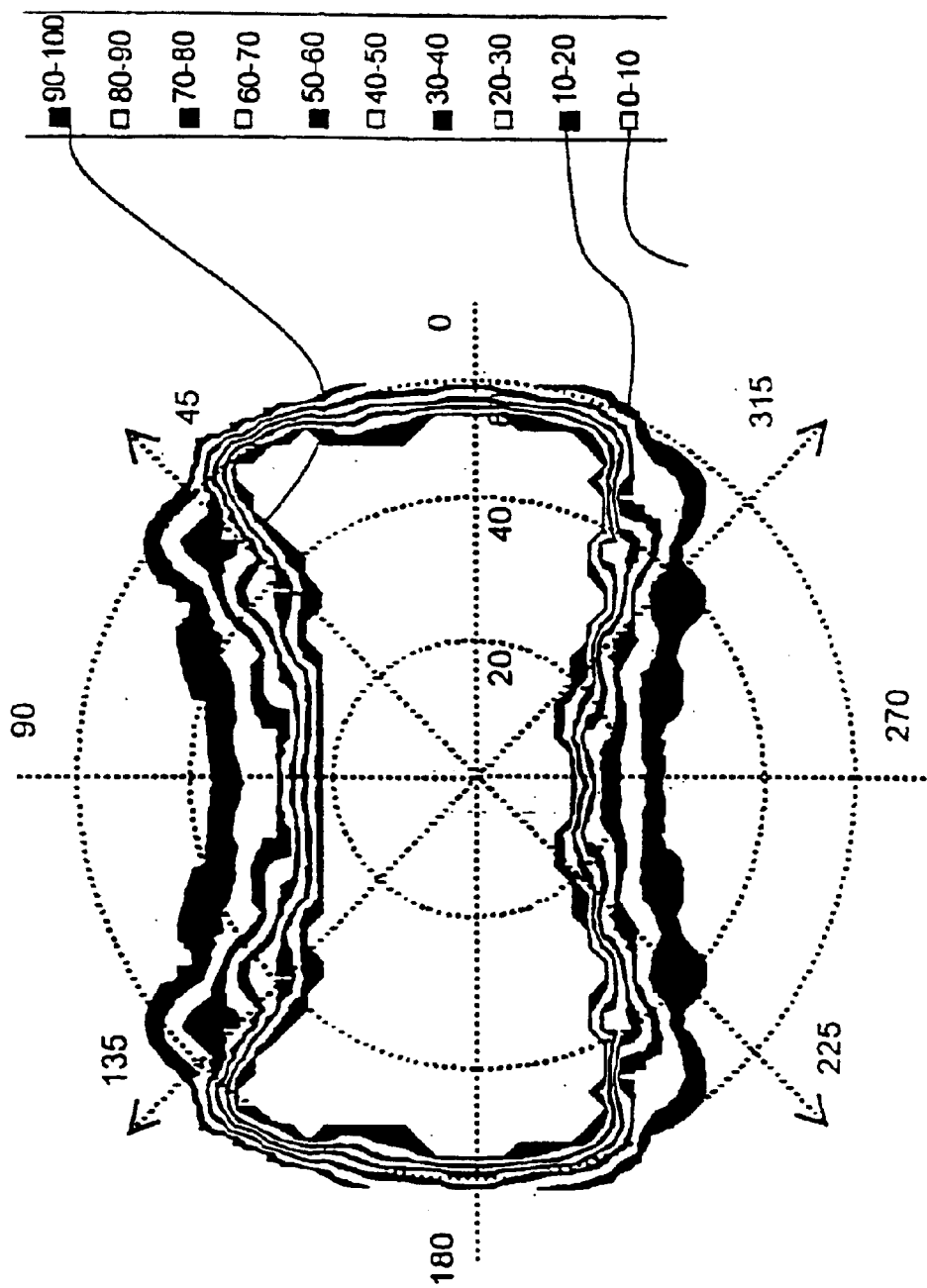
Figure 8B:
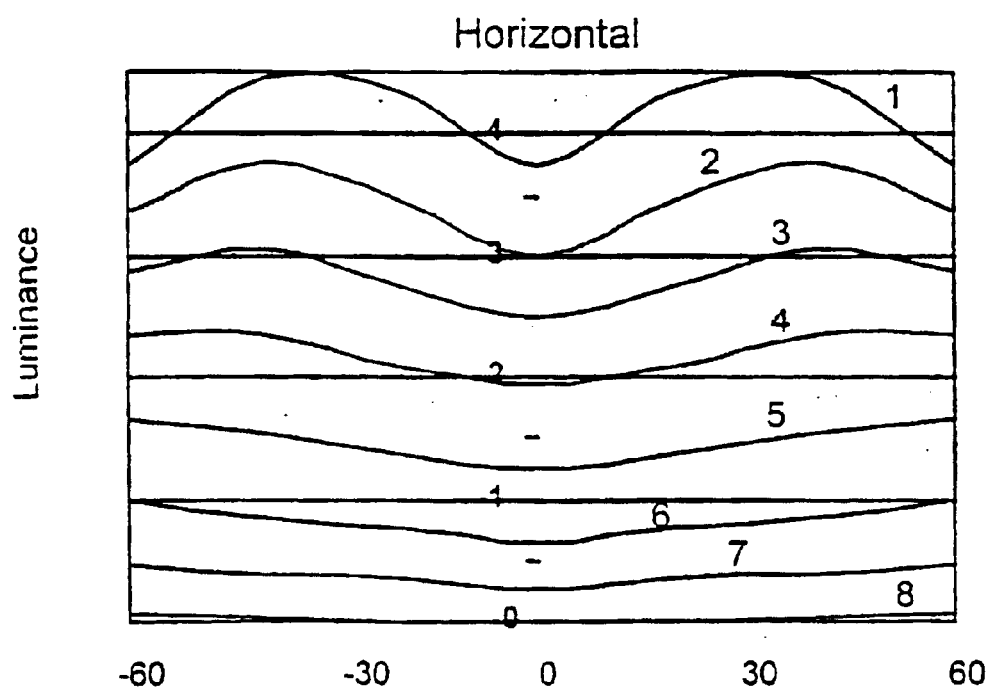
Figure 8C:
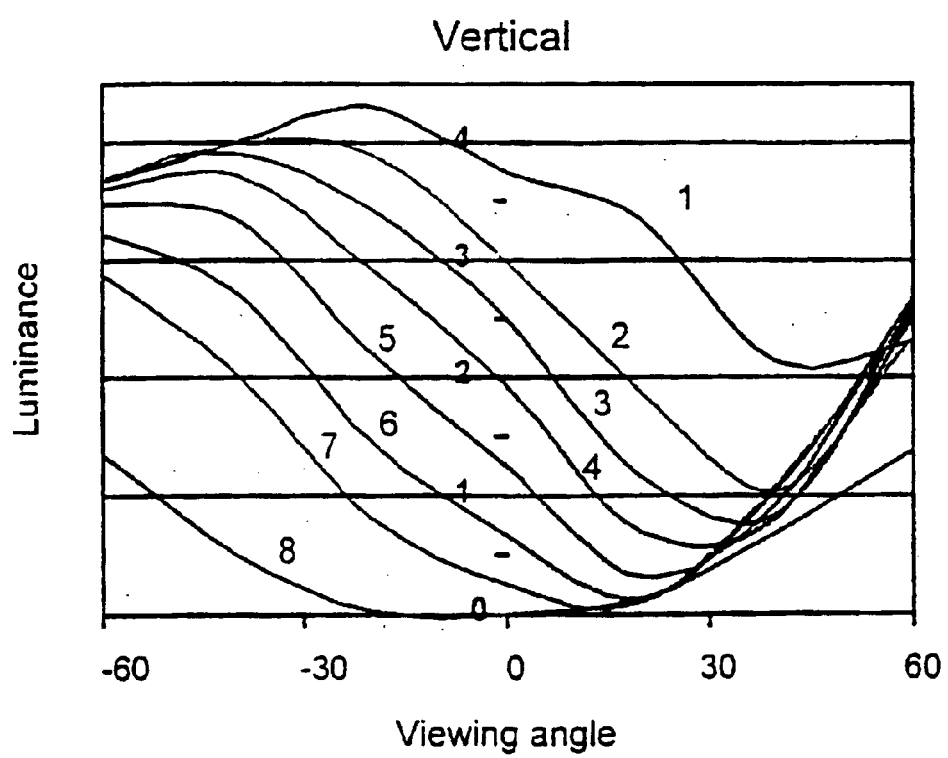

FIG. 8a shows the isocontrast plot of the display, FIG. 8b and FIG. 8c show the grey levels (transmission versus viewing angle) in horizontal and vertical directions respectively. It is obvious that, compared to the compensated display according to prior art of comparison example B, the viewing angle is significantly enlarged (see FIG. 8a), and the grey levels are further improved, both in horizontal and vertical direction.

EXAMPLE 3

The following polymerizable mixture was formulated

| | |
|---|---|
| Compound (1) | 7.5% |
| Compound (2) | 10.5% |
| Compound (3) | 21.5% |
| Compound (4) | 49.5% |
| Compound (5) | 6.5% |
| Irgacure 1076 ® | 4.0% |
| Fluorad FC171 | 0.5% |

(1)

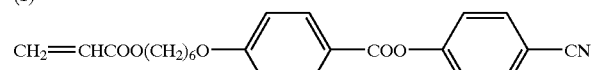

$CH_2$=$CHCOO(CH_2)_6O$—⟨phenyl⟩—COO—⟨phenyl⟩—CN (2)

-continued

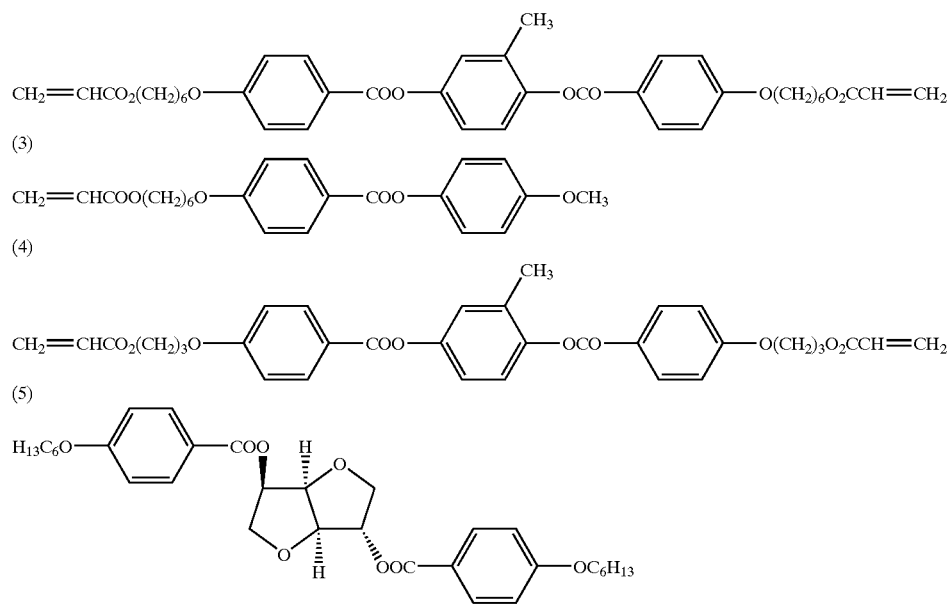

Compounds (1) and (3) can be prepared according to or in analogy to the methods described in D. J. Broer et al., Makromol. Chem. 190, 3201–3215 (1989). The direactive compounds (2) and (4) can be prepared as described in WO 93/22397. The preparation of compound (4) is described in WO 98/00428. Irgacure 907 is a commercially available photoinitiator (from Ciba AG, Basel, Switzerland). Fluorad FC 171 is a commercially available non-ionic fluorocarbon surfactant (from 3M Corp.).

Samples of the above mixture were coated from a solution in toluene (Concentration range 15–30% by weight) onto a TAC substrate of 80 μm thickness, which had been previously rubbed to induce planar alignment on the substrate surface, to give coatings of different thickness. After coating the samples were held at room temperature for 5 minutes and at 80° C. for 5 minutes, allowed to cool to room temperature, and passed under a high power UV lamp (medium pressure mercury) at a speed of 10 meters/minute.

Figure 9:
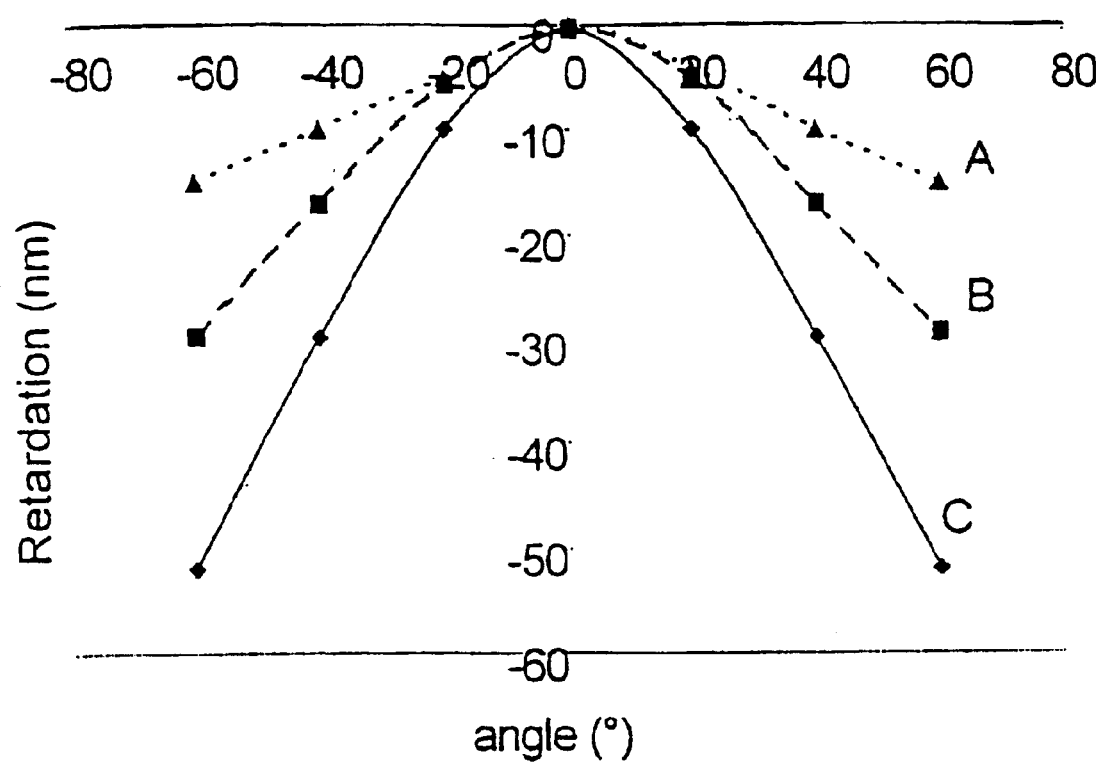
FIG. 9 is a graphical depiction of retardation (nm) versus angle (°) for samples A, B, and C.

Three cholesteric polymer films with a thickness of 0.5 μm (Sample A), 1.2 μm (Sample B) and 5.2 μm (Sample C) were obtained, which reflect UV light, show negative C symmetry and are suitable as viewing angle compensators. FIG. 9 shows the retardation film of the films A–C at different viewing angles.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various conditions and usages.

What is claimed is:

1. An optical compensator for a liquid crystal display comprising:
    at least one O plate retarder, and
    at least one negative C plate retarder comprising a polymerized mesogenic material with a twist angle φ of more than 90° and a helical pitch of less than 250 nm.

2. An optical compensator according to claim 1, wherein an average tilt angle $\theta_{ave}$ in said O plate retarder is from 2–88°.

3. An optical compensator according to claim 1, wherein the twist angle φ in said negative C plate retarder is at least 360°.

4. An optical compensator according to claim 1, wherein a tilt angle in said O plate retarder varies monotonously in a direction perpendicular to a plane of a film from a minimum value $\theta_{min}$ at one surface of the film to a maximum value $\theta_{max}$ at an opposite surface of the film.

5. An optical compensator according to claim 4, wherein $\theta_{min}$ is from 0–80°.

6. An optical compensator according to claim 4, wherein $\theta_{max}$ is from 10–90°.

7. An optical compensator according to claim 1, wherein the thickness of said O plate retarder and/or negative C plate retarder is from 0.1–10 μm.

8. An optical compensator according to claim 1, wherein an optical retardation of said O plate retarder and/or negative C plate retarder is from 6–300 nm.

9. An optical compensator according to claim 1, wherein said O plate retarder comprises a linear or crosslinked polymerized liquid crystalline material with a tilted or splayed structure.

10. An optical compensator according to claim 1, wherein said negative C plate retarder comprises a linear or crosslinked polymerized chiral liquid crystalline material with a helically twisted structure.

11. A liquid crystal display device comprising the following elements
    a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates,
    a polarizer arranged outside said transparent substrates, or a pair of polarizers sandwiching said substrates, and at least one optical compensator according to claim 1 being situated between the liquid crystal cell and at least one of said polarizers, it being possible for the above elements to be separated, stacked, mounted on top of each other, coated on top of each other or connected by means of adhesive layers.

12. An optical compensator according to claim 1, wherein a tilt angle in the O plate retarder varies monotonously in a direction perpendicular to a plane of the O plate retarder from a minimum value $\theta_{min}$ at one surface of the O plate retarder to a maximum value $\theta_{max}$ at the opposite surface of the O plate retarder.

13. An optical compensator according to claim 12, wherein $\theta_{min}$ is 1–20°.

14. An optical compensator according to claim 12, wherein $\theta_{max}$ is 40–90°.

15. An optical compensator according to claim 1, wherein the twist angle φ is larger than 180°.

16. An optical compensator according to claim 1, further comprising two negative C plate retarders.

17. An optical compensator according to claim 1, wherein said at least one O plate retarder comprises a negatively birefringent substrate having the optical properties of a negative C plate retarder.

18. An optical compensator for a liquid crystal display comprising:

at least one O plate retarder; and at least one negative C plate retarder with a helical pitch of 250 nm or less.

19. An optical compensator according to claim 18, wherein the at least one negative C plate retarder is obtained by polymerizing an oriented polymerized composition, said composition comprising at least one achiral polymerizable mesogenic compound and at least one non-polymerizable chiral compound, polymerizable chiral mesogenic compound or polymerizable chiral non-mesogenic compound.

20. A liquid crystal display comprising a liquid crystal cell and at least one optical compensator according to claim 18.

21. A liquid crystal display comprising a liquid crystal cell and at least one optical compensator according to claim 19.

22. An optical compensator according to claim 19, wherein the achiral and chiral compounds are selected from the group of formulae Ia–Iq, IIa–d, IIIa and IIIb:

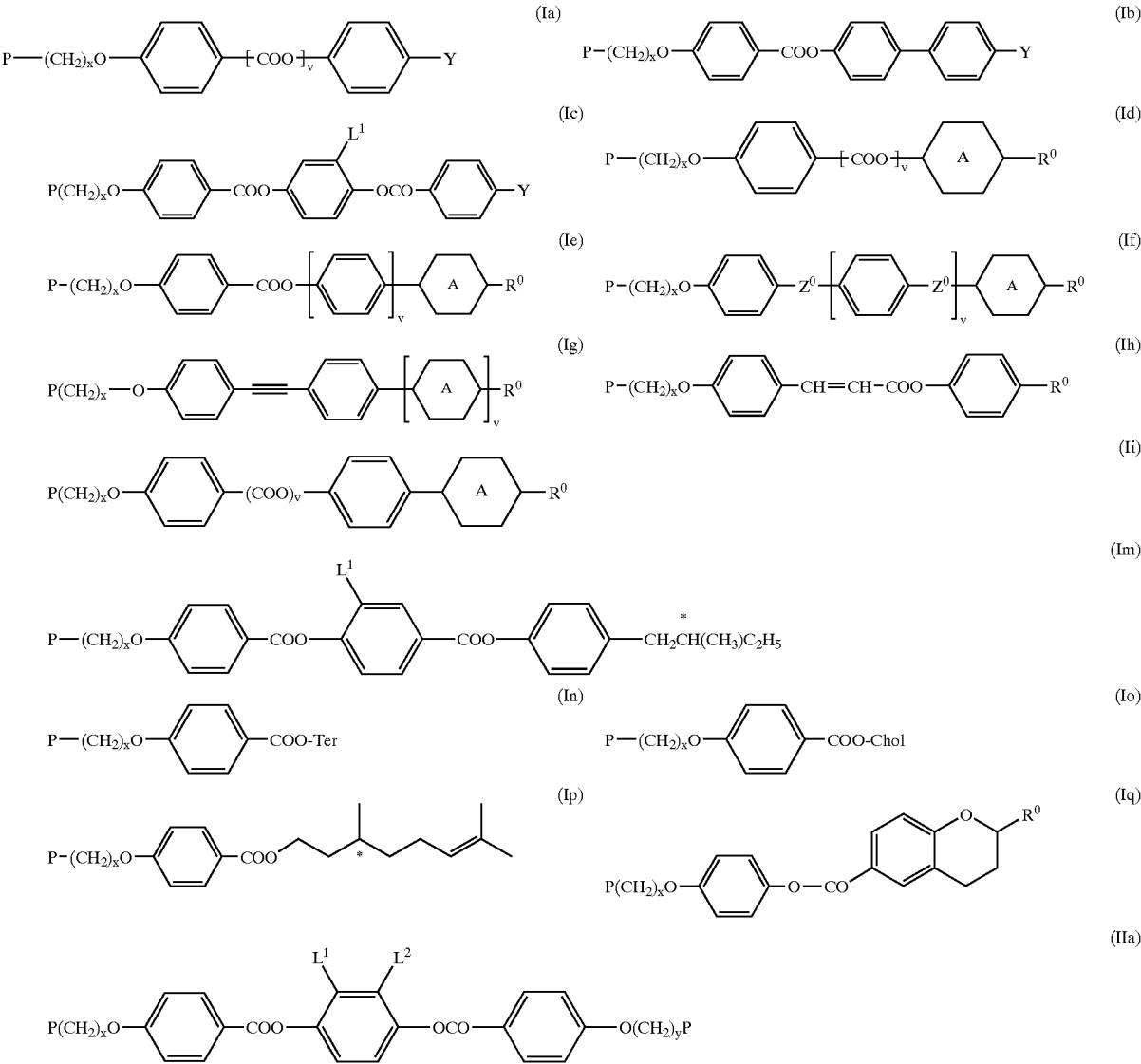

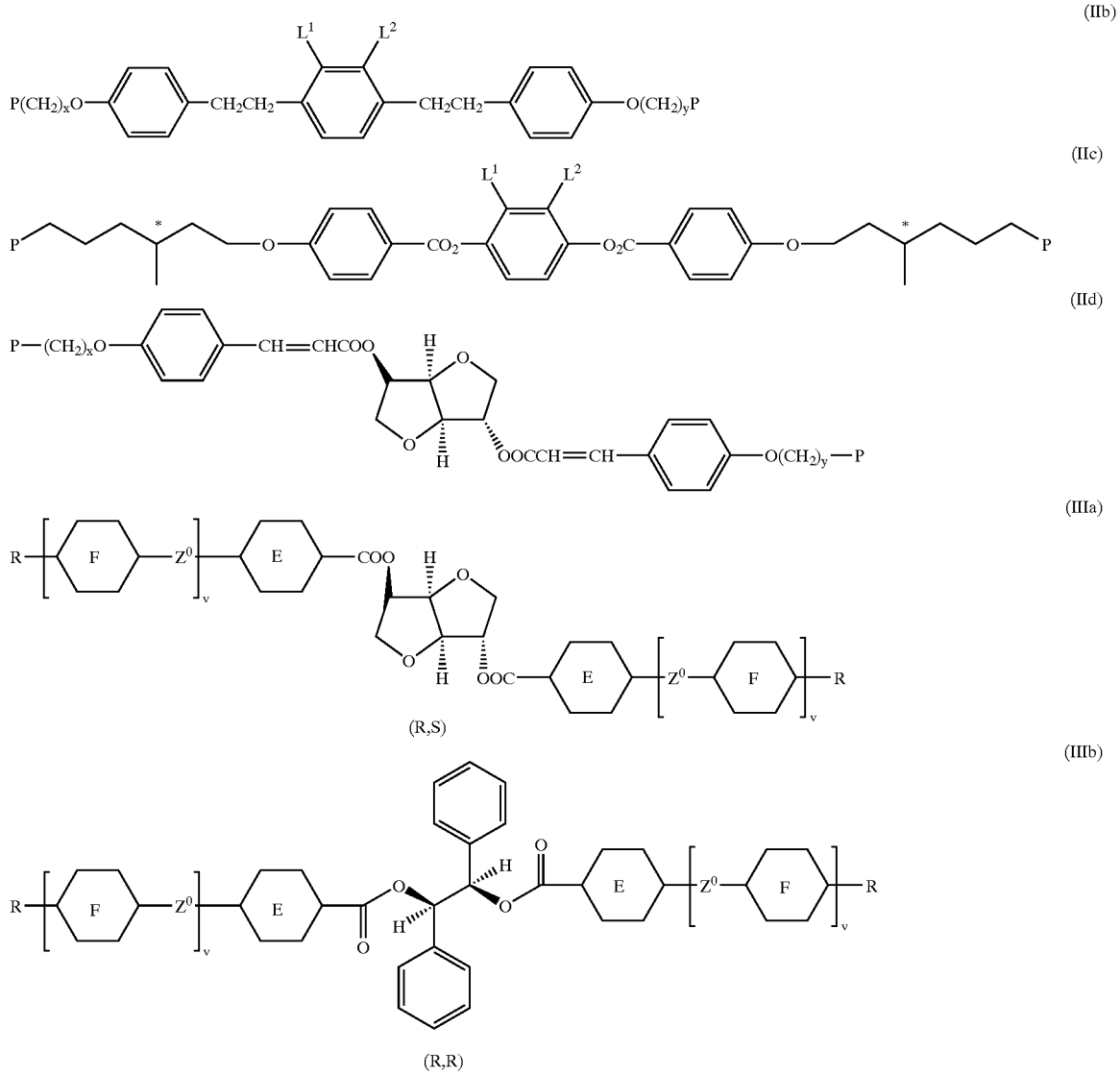

including the (R, S), (S, R), (R, R) and (S, S) enantiomers not shown, wherein:

P is a polymerizable group; x and y are each, independently, 1–12; ring A is 1,4-phenylene optionally mono- di- or trisubstituted by $L^1$ or 1,4-cyclohexylene; v is 0 or 1; $Z^0$ is —COO—, —OCO—, —CH$_2$CH$_2$— or a single bond; Y is a polar group; $R^0$ is an unpolar alkyl or alkoxy group; Ter is a terpenoid radical; Chol is a cholesteryl group; $L^1$ and $L^2$ are each, independently, H, F, Cl, CN or an optionally halogenated alkyl, alkoxy, alkylcarbonyl, alkoxycarbonyl or alkoxycarbonyloxy group with 1–7 C atoms, ring E and ring F are each, independently, 1,4-phenylene or trans-1,4-cyclohexylene, and R is alkyl, alkoxy or alkanoyl with 1–12 C atoms.

23. An optical compensator according to claim 19, wherein the compensator is obtained from a polymerizable mesogenic composition comprising at least one mono- or direactive archiral mesogenic compound, and at least one chiral compound of a monoreactive or a non-reactive compound.

* * * * *

UNITED STATES PATENT AND TRADEMARK OFFICE
CERTIFICATE OF CORRECTION

PATENT NO. : 6,912,030 B1  Page 1 of 1
APPLICATION NO. : 10/088359
DATED : June 28, 2005
INVENTOR(S) : David Coates et al.

It is certified that error appears in the above-identified patent and that said Letters Patent is hereby corrected as shown below:

Column 30, line 53 reads, "archiral" should read -- achiral --

Signed and Sealed this

Fifteenth Day of January, 2008

JON W. DUDAS
*Director of the United States Patent and Trademark Office*